US011916611B2

(12) United States Patent
Pezeshki et al.

(10) Patent No.: US 11,916,611 B2
(45) Date of Patent: Feb. 27, 2024

(54) NEURAL NETWORK MODEL SHARING WITH ZONE IDENTIFIER

(71) Applicant: QUALCOMM Incorporated, San Diego, CA (US)

(72) Inventors: Hamed Pezeshki, San Diego, CA (US); Tao Luo, San Diego, CA (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 277 days.

(21) Appl. No.: 17/201,318

(22) Filed: Mar. 15, 2021

(65) Prior Publication Data

US 2022/0294548 A1    Sep. 15, 2022

(51) Int. Cl.
*H04B 17/391* (2015.01)
*H04W 4/021* (2018.01)
*G06N 3/08* (2023.01)
*H04W 72/542* (2023.01)

(52) U.S. Cl.
CPC ......... *H04B 17/3913* (2015.01); *G06N 3/08* (2013.01); *H04W 4/021* (2013.01); *H04W 72/542* (2023.01)

(58) Field of Classification Search
CPC ............ H04B 17/3913; H04W 72/542; H04W 4/021; G06N 3/08
See application file for complete search history.

(56) References Cited

U.S. PATENT DOCUMENTS

| 10,713,702 | B1 * | 7/2020 | Langdon | ............ G06Q 30/0243 |
| 2014/0007222 | A1 * | 1/2014 | Qureshi | ................. H04L 67/10 |
| | | | | 726/16 |
| 2020/0029318 | A1 * | 1/2020 | Guo | ....................... H04L 1/1822 |
| 2021/0329522 | A1 * | 10/2021 | Li | ........................ H04W 36/18 |

* cited by examiner

*Primary Examiner* — Natasha W Cosme
(74) *Attorney, Agent, or Firm* — Procopio, Cory, Hargreaves & Savitch LLP

(57) ABSTRACT

Aspects presented herein may enable a base station to share trained neural network from one UE to other UE(s) to improve the efficiency of a neural network training. In one aspect, a base station receives, from a first UE, one or more ML model parameters based on a first zone ID that identifies a first geographical zone, the one or more ML model parameters being associated with the first zone ID or the first geographical zone or both. The base station provides the one or more ML model parameters to a second UE based on at least one of the zone ID or the first geographical zone.

26 Claims, 16 Drawing Sheets

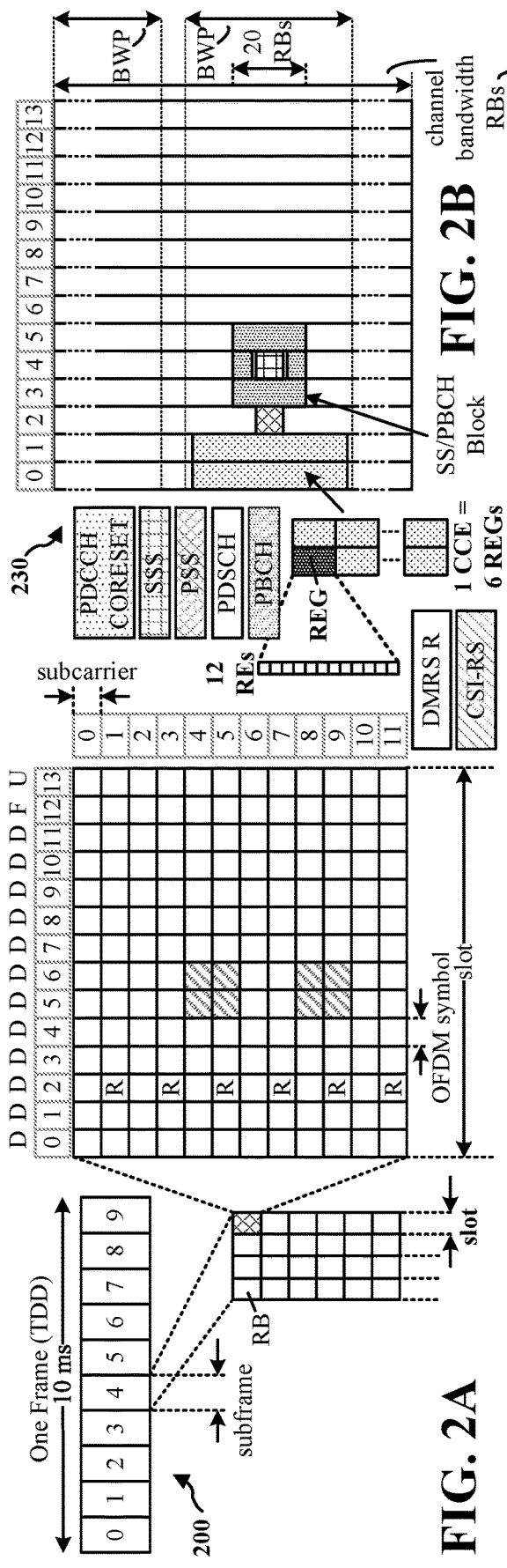
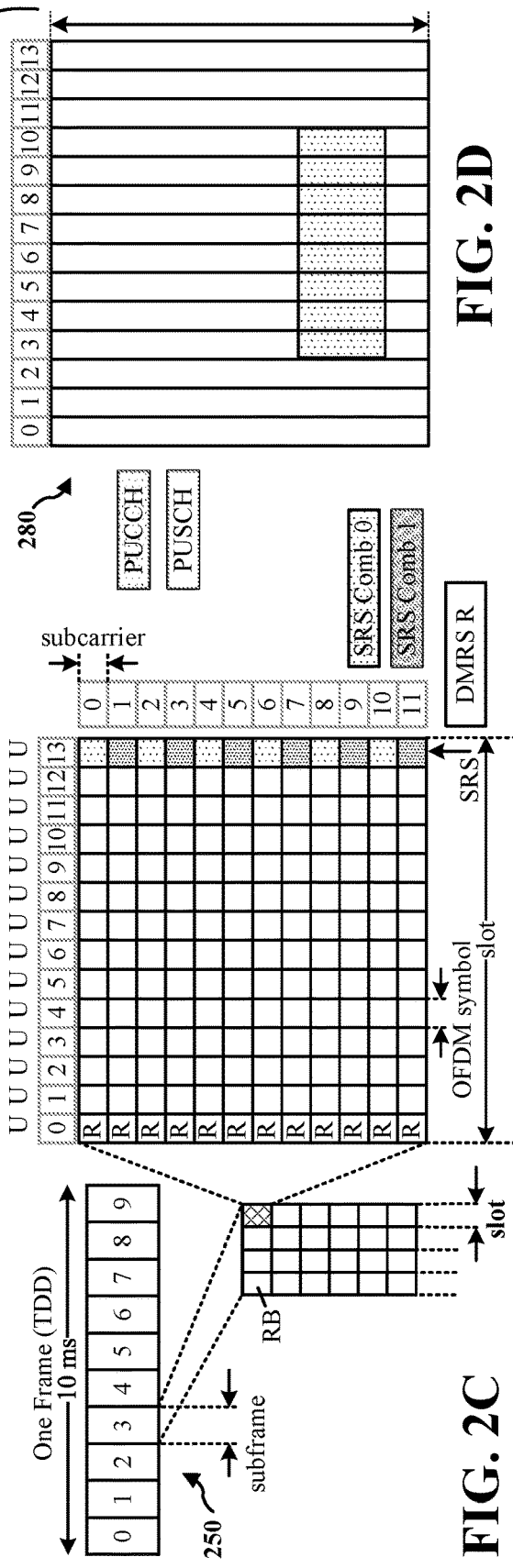
FIG. 2A
FIG. 2B
FIG. 2C
FIG. 2D

NEURAL NETWORK MODEL SHARING WITH ZONE IDENTIFIER

TECHNICAL FIELD

The present disclosure relates generally to communication systems, and more particularly, to wireless communication involving a neural network.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided for wireless communication of a base station. The apparatus receives, from a first user equipment (UE), one or more machine learning (ML) model parameters based on a first zone identifier (ID) that identifies a first geographical zone, the one or more ML model parameters being associated with the first zone ID or the first geographical zone or both. The apparatus provides the one or more ML model parameters to a second UE based on at least one of the zone ID or the first geographical zone.

In an aspect of the disclosure, a method, a computer-readable medium, and an apparatus are provided for wireless communication of a UE. The apparatus receives, from a base station, multiple zone IDs including a first zone ID and a corresponding set of ML model parameters, wherein each zone ID identifies a geographical zone and is associated with one or more ML model parameters. The apparatus applies a set of ML model parameters based on a location of the UE being within a corresponding zone ID for the set of ML model parameters.

In an aspect of the disclosure, a method, a computer-readable medium, and an apparatus are provided for wireless communication of a UE. The apparatus transmits, to a base station, a set of ML model parameters. The apparatus transmits, to the base station, position information for the UE associated with the set of ML model parameters.

In an aspect of the disclosure, a method, a computer-readable medium, and an apparatus are provided for wireless communication of a UE. The apparatus establishes a sidelink communication with a second UE. The apparatus transmits, to the second UE, a set of one or more ML model parameters based on a location of the first UE, the one or more ML model parameters being associated with a geographic area including the location of the first UE.

In an aspect of the disclosure, a method, a computer-readable medium, and an apparatus are provided for wireless communication of a UE. The apparatus establishes a sidelink communication with a first UE. The apparatus receives, from the first UE, one or more ML model parameters based on a subset of zone IDs identifying one or more geographical zones, the one or more ML model parameters being associated with the subset of zone IDs or the one or more geographical zones or both.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
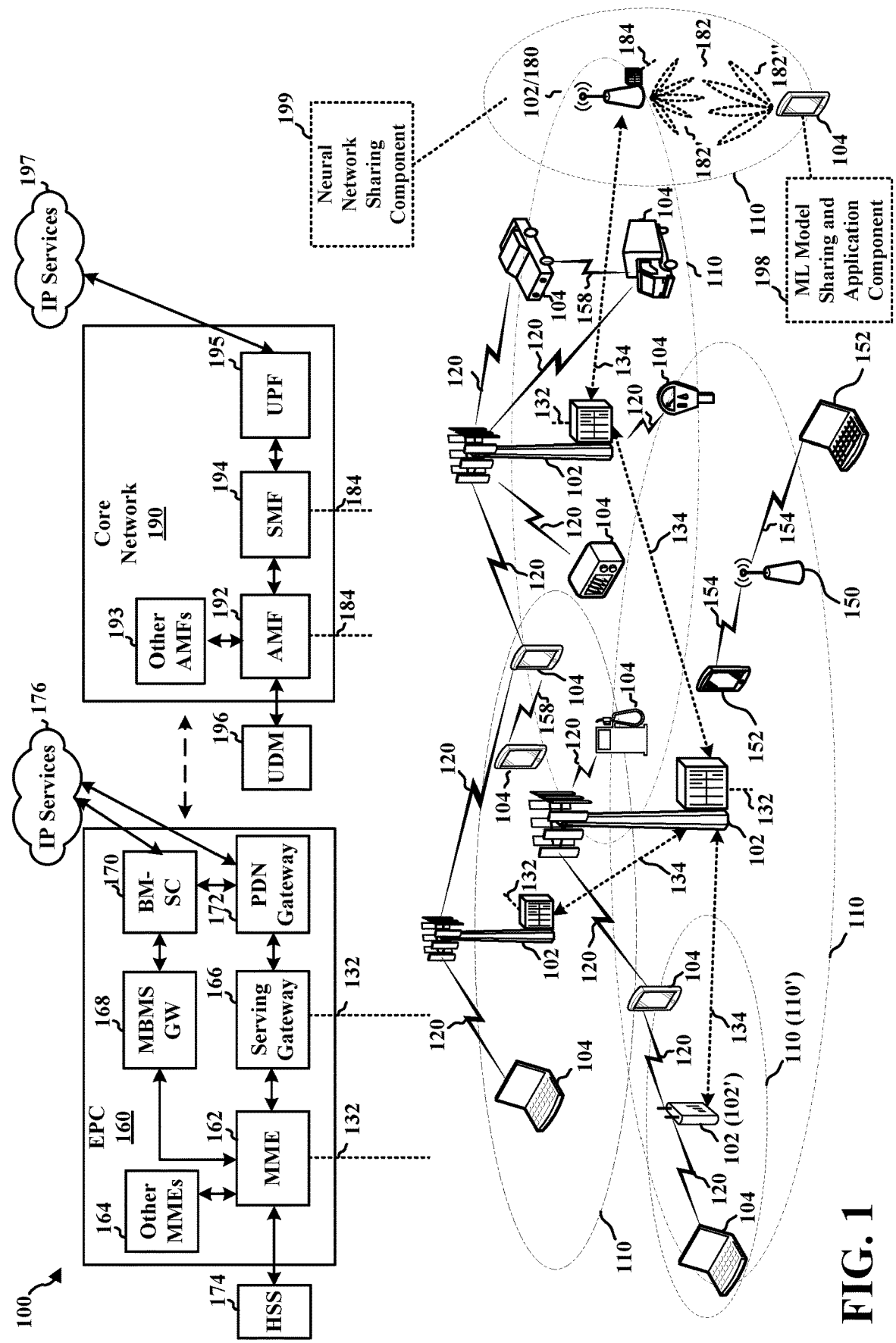
FIG. 1 is a diagram illustrating an example of a wireless communications system and an access network in accordance with aspects presented herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

In certain aspects, the base station 102/180 may include a neural network sharing component 199 configured to receive and share trained neural network parameters from a UE with other UE(s) based on zone IDs, or other location information, associated with the UEs. In one configuration, the neural network sharing component 199 may be configured to receive, from a first UE, one or more ML model parameters based on a first zone ID that identifies a first geographical zone, the one or more ML model parameters being associated with the first zone ID or the first geographical zone or both. In such configuration, the neural network sharing component 199 may provide the one or more ML model parameters to a second UE based on at least one of the zone ID or the first geographical zone.

In certain aspects, the UE 104 may include an ML model sharing and application component 198 configured to receive trained neural network (e.g., trained ML parameters) and apply the trained neural network based on zone ID. In one configuration, the ML model sharing and application component 198 may be configured to receive, from a base station, multiple zone IDs including a first zone ID and a corresponding set of ML model parameters, wherein each zone ID identifies a geographical zone and is associated with one or more ML model parameters. In such configuration, the ML model sharing and application component 198 may apply a set of ML model parameters based on a location of the UE being within a corresponding zone ID for the set of ML model parameters.

In certain aspects, the ML model sharing and application component 198 is configured to transmit/share trained neural network (e.g., trained ML parameters) with a base station. In one configuration, the ML model sharing and application component 198 may be configured to transmit, to a base station, a set of ML model parameters. In such configuration, the ML model sharing and application component 198 may transmit, to the base station, position information for the UE associated with the set of ML model parameters.

In certain aspects, the ML model sharing and application component 198 is configured to transmit/share trained neural network (e.g., trained ML parameters) to another UE. In one configuration, the ML model sharing and application component 198 may be configured to establish a sidelink communication with a second UE. In such configuration, the ML model sharing and application component 198 may transmit, to the second UE, a set of one or more ML model parameters based on a location of the first UE, the one or more ML model parameters being associated with a geographic area including the location of the first UE.

In certain aspects, the ML model sharing and application component 198 is configured to receive and apply trained neural network (e.g., trained ML parameters) from another UE. In one configuration, the ML model sharing and application component 198 may be configured to establish a sidelink communication with a first UE. In such configuration, the ML model sharing and application component 198 may receive, from the first UE, one or more ML model parameters based on a subset of zone IDs identifying one or more geographical zones, the one or more ML model parameters being associated with the subset of zone IDs or the one or more geographical zones or both.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6

GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 4 allow for 1, 2, 4, 8, and 16 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu*15$ kHz, where $\mu$ is the numerology 0 to 4. As such, the numerology $\mu=0$ has a subcarrier spacing of 15 kHz and the numerology $\mu=4$ has a subcarrier spacing of 240 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s. Within a set of frames, there may be one or more different bandwidth parts (BWPs) (see FIG. 2B) that are frequency division multiplexed. Each BWP may have a particular numerology.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARD) ACK/NACK feedback. The PUSCH carries data, and may additionally be used to carry a buffer status report (BSR), a power headroom report (PHR), and/or UCI.

Figure 3:
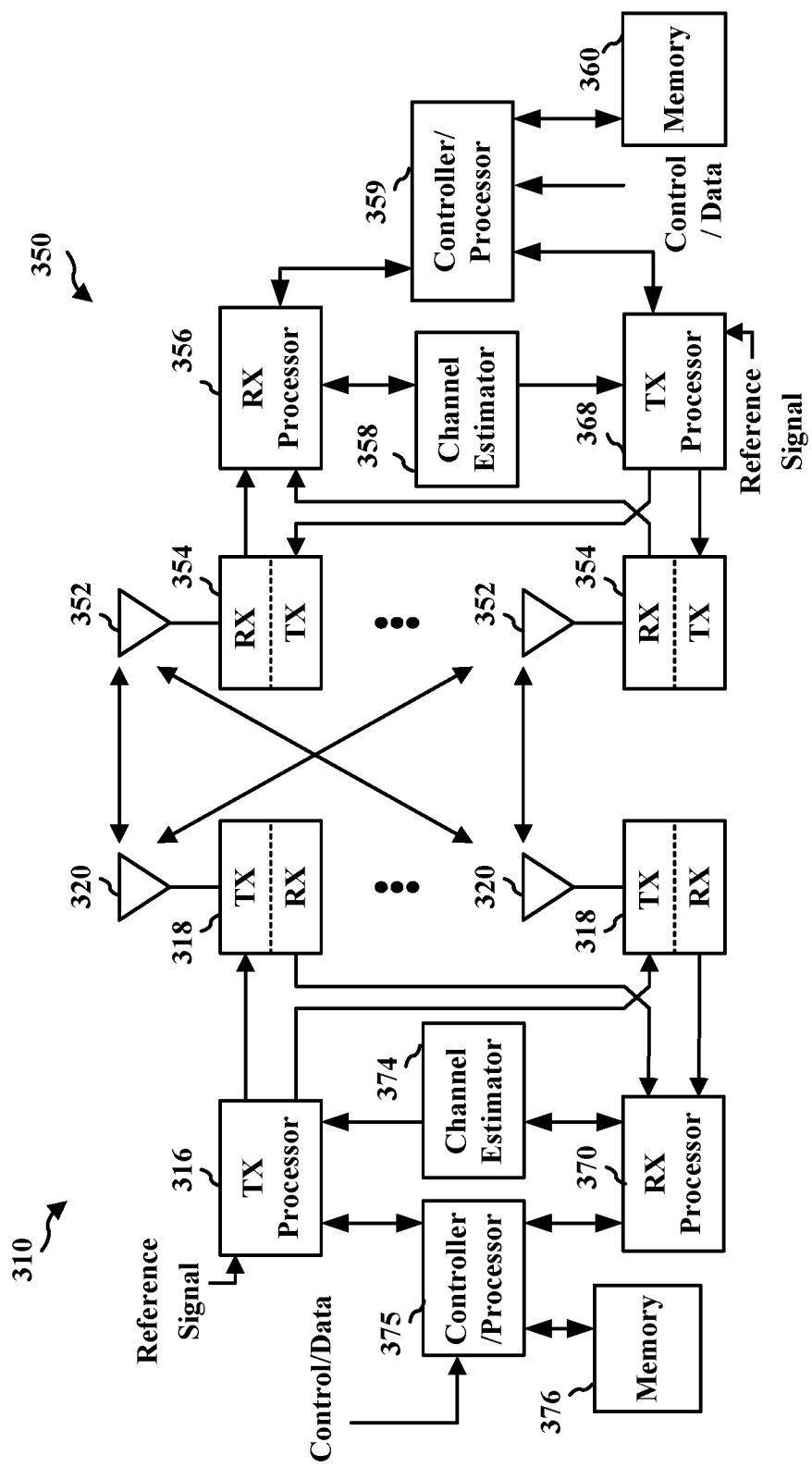
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate an RF carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the ML model sharing and application component 198 of FIG. 1.

At least one of the TX processor 316, the RX processor 370, and the controller/processor 375 may be configured to perform aspects in connection with the neural network sharing component 199 of FIG. 1.

A UE may use machine-learning algorithms, deep-learning algorithms, neural networks, or advanced signal processing methods for aspects of wireless communication, e.g., with a base station, another UE, etc.

In some aspects described herein, an encoding device (e.g., a UE) may train one or more neural networks to learn dependence of measured qualities on individual parameters. Among others, examples of machine learning models or neural networks include artificial neural networks (ANN); decision tree learning; convolutional neural networks (CNNs); deep learning architectures in which an output of a first layer of neurons becomes an input to a second layer of neurons, and so forth; support vector machines (SVM), e.g., including a separating hyperplane (e.g., decision boundary) that categorizes data; regression analysis; Bayesian networks; genetic algorithms; Deep convolutional networks (DCNs) configured with additional pooling and normalization layers; and Deep belief networks (DBNs).

A machine learning model, such as an artificial neural network (ANN), may include an interconnected group of artificial neurons (e.g., neuron models), and may be a computational device or may represent a method to be performed by a computational device. The connections of the neuron models may be modeled as weights. Machine learning models may provide predictive modeling, adaptive control, and other applications through training via a dataset. The model may be adaptive based on external or internal information that is processed by the machine learning model. Machine learning may provide non-linear statistical data model or decision making and may model complex relationships between input data and output information.

A machine learning model may include multiple layers and/or operations that may be formed by concatenation of one or more of the referenced operations. Examples of operations that may be involved include extraction of various features of data, convolution operations, fully connected operations that may be activated or deactivates, compression, decompression, quantization, flattening, etc. As used herein, a "layer" of a machine learning model may be used to denote an operation on input data. For example, a convolution layer, a fully connected layer, and/or the like may be used to refer to associated operations on data that is input into a layer. A convolution A×B operation refers to an operation that converts a number of input features A into a number of output features B. "Kernel size" may refer to a number of adjacent coefficients that are combined in a dimension. As used herein, "weight" may be used to denote one or more coefficients used in the operations in the layers for combining various rows and/or columns of input data. For example, a fully connected layer operation may have an output y that is determined based at least in part on a sum of a product of input matrix x and weights A (which may be a matrix) and bias values B (which may be a matrix). The term "weights" may be used herein to generically refer to both weights and bias values. Weights and biases are examples of parameters of a trained machine learning model. Different layers of a machine learning model may be trained separately.

Machine learning models may include a variety of connectivity patterns, e.g., including any of feed-forward networks, hierarchical layers, recurrent architectures, feedback connections, etc. The connections between layers of a neural network may be fully connected or locally connected. In a fully connected network, a neuron in a first layer may communicate its output to each neuron in a second layer, and each neuron in the second layer may receive input from every neuron in the first layer. In a locally connected network, a neuron in a first layer may be connected to a limited number of neurons in the second layer. In some aspects, a convolutional network may be locally connected and configured with shared connection strengths associated with the inputs for each neuron in the second layer. A locally connected layer of a network may be configured such that each neuron in a layer has the same, or similar, connectivity pattern, but with different connection strengths.

A machine learning model or neural network may be trained. For example, a machine learning model may be trained based on supervised learning. During training, the machine learning model may be presented with input that the model uses to compute to produce an output. The actual output may be compared to a target output, and the difference may be used to adjust parameters (such as weights and biases) of the machine learning model in order to provide an output closer to the target output. Before training, the output may be incorrect or less accurate, and an error, or difference, may be calculated between the actual output and the target output. The weights of the machine learning model may then be adjusted so that the output is more closely aligned with the target. To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error or to move the output closer to the target. This manner of adjusting the weights may be referred to as back propagation through the neural network. The process may continue until an achievable error rate stops decreasing or until the error rate has reached a target level.

The machine learning models may include computational complexity and substantial processor for training the machine learning model.

A communication system may be associated or implemented with a neural network (NN), which may also be referred to as an artificial neural network learning algorithm. A neural network may include a computational learning system, which may be implemented at a UE and/or at a base station, that uses one or more algorithms/functions to interpret and translate an input data into a target output data. For example, if an input data includes a color green, a goal of a neural network is to identify the input data as the color green at an output through training and machine learning. In one example, a neural network may learn or may be trained by processing examples, where each example may include an input and a result which may form probability-weighted associations between the input and the result. For example, the training of a neural network may involve determining the difference between a processed output of the network and a target output (e.g., between the color blue and the color green). Then, the neural network may adjust its weighted associations according to a learning rule (e.g., the color blue is given less weight and the color green is given more weight for same or similar input data (e.g., green)). After successive adjustments, the neural network may produce output which is increasingly similar to the target output. Then, after the neural network performs a sufficient number of adjustments, the training may be terminated, such as when the neural network may identify/translate an input data to a target output with an accuracy above a threshold.

A neural network may be associated with different machine learning (ML) models, where different ML models may be suitable for different types of learnings, devices, scenarios, and/or environments, etc. For example, certain ML models may be scenario specific, where some ML models may be suitable for urban micro (UMi) environment, some ML models may be suitable for urban macro (UMA) environment, and some ML models may be suitable for indoor hotspot (InH) environment, etc. As such, a neural network may update ML model(s) at a UE to provide more suitable ML model(s) for the UE based on the UE's condition and/or environment. For example, when a UE is at a UMi environment, the UE may be configured (e.g., by a base station or by the UE itself) to apply a first ML model and/or a first set of ML model parameters. When the UE moves to an InH environment, the UE may be configured to apply a second ML model and/or a second set of ML model parameters, etc.

Figure 4:
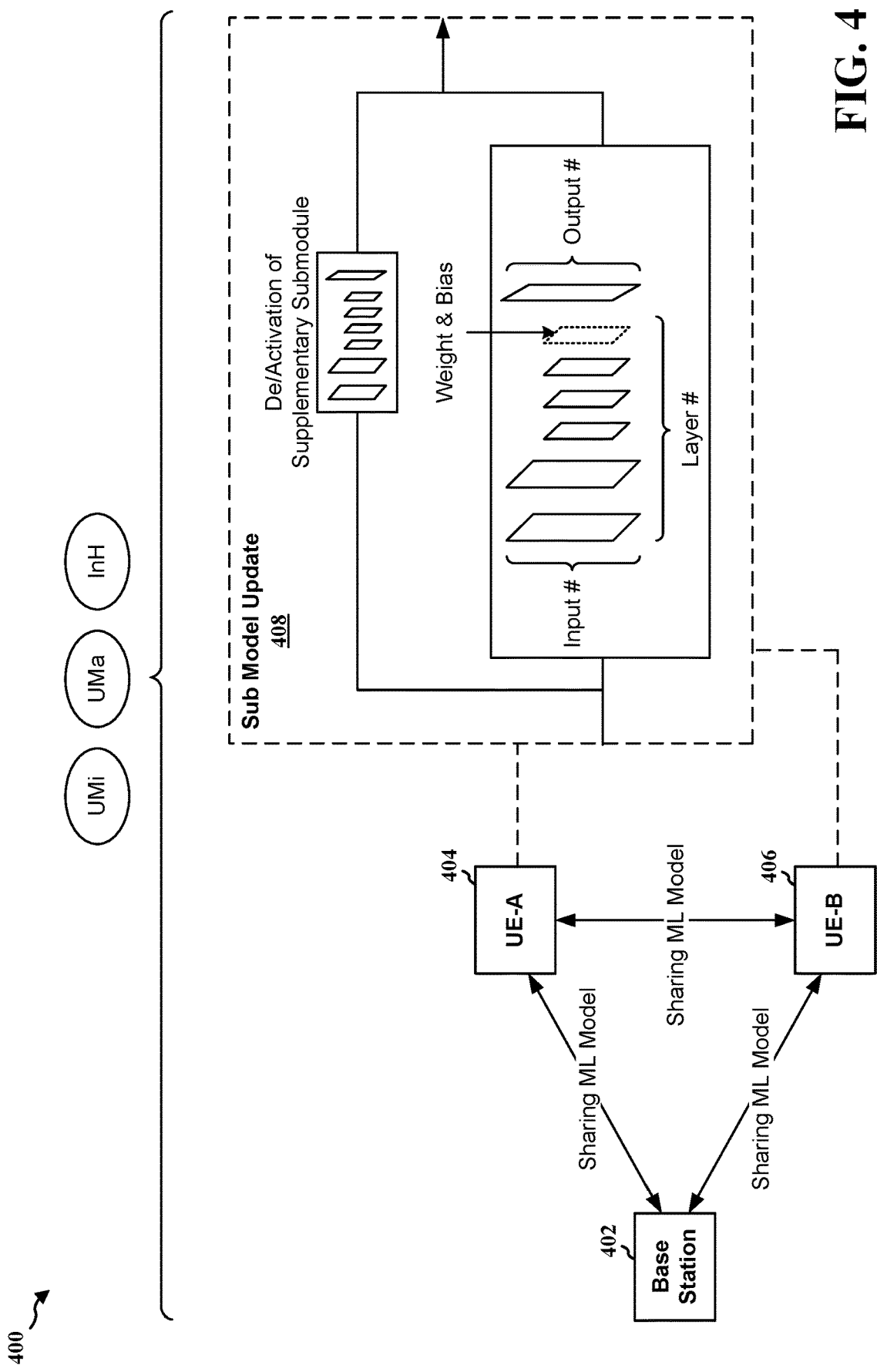
FIG. 4 is a diagram illustrating an example of a sub model update and sharing of an ML model.

In some examples, in order to conserve or reduce signaling overhead and/or when a full ML model update may not be feasible in some radio conditions, a neural network may update a sub model of an ML model applied by a UE instead of the full ML model. FIG. 4 is a diagram 400 illustrating an example of a sub model update and sharing of an ML model. In some examples, a UE may request a neural network for an ML model or a sub ML model update, a UE may upload ML model(s) (e.g., trained/learned parameters related to one or more ML models) to the base station and/or a UE may share ML model(s) with other UE(s). For example, a first UE 404 and/or a second UE 406 may be applying a first ML model at an UMi environment. If the first UE 404 and/or the second UE 406 detect an environment change, such as when the first UE 404 and/or the second UE 406 move to an InH environment, the first UE 404 and/or the second UE 406 may look for a new ML model for the new environment. For example, the first UE 404 and/or the second UE 406 may request a base station 402 (e.g., the base station implemented/associated with the neural network) for an ML model update or a sub ML model update 408 that is suitable for the new environment (e.g., the InH environment). As such, after the ML model update or the sub ML model update 408, the first UE 404 and/or the second UE 406 may apply the new or updated ML model at the new environment.

In another example, a UE may share a trained ML model with another UE, either directly, or indirectly through a base station to leverage their learned ML model(s). In some aspects, the trained ML model may be applicable in a geographical area. For example, the first UE 404 and the second UE 406 may be applying a same ML model or ML models with similar parameters. If the ML model applied at the first UE 404 has been trained, the first UE 404 may transmit the trained ML model to the base station 402, such that the base station 402 may share the trained ML model with other UEs, such as the UE 406. Alternatively, or additionally, the first UE 404 may detect the presence of the second UE 406 and/or that the second UE 406 is applying an ML model that is the same or similar to the ML model applied by the first UE 404. In response, the first UE 404 may transmit the trained ML model directly to the second UE 406, such as via a sidelink communication instead of sharing ML parameters through the base station 402.

Figure 5:
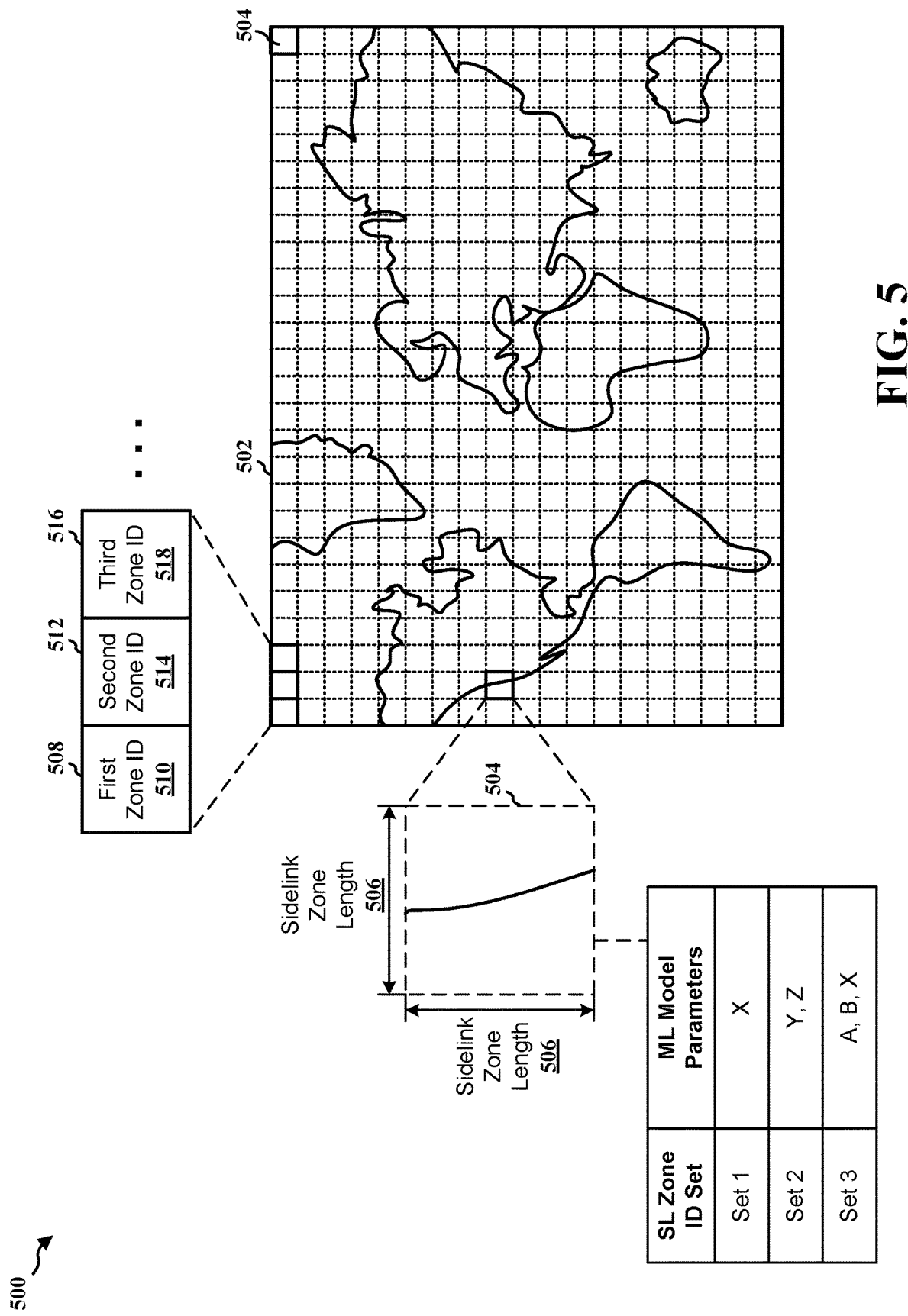
FIG. 5 is a diagram illustrating an example of identifying a geographical area based on a zone ID over a sidelink communication.

A wireless device, such as a sidelink UE and/or a base station, may identify a geographical area/zone in a sidelink communication based on a zone identifier (ID) that is associated with the geographical area/zone. The zone ID, as determined for sidelink communication, may be referred to herein as a "sidelink zone ID." FIG. 5 is a diagram 500 illustrating an example of identifying a geographical area based on a zone ID over a sidelink communication. In one aspect, the whole earth 502 may be divided into small squares 504 of configurable zone length 506 (e.g., a size between a defined maximum zone length and a defined minimum zone length: minimum zone length≤configured zone length 506≤maximum zone length, etc.). Then, each of the squares 504 may be assigned or may be associated with a zone ID. For example, a first square 508 may be associated with a first zone ID 510, a second square 512 may be associated with a second zone ID 514, a third square 516 may be associated with a third zone ID 518, etc. In one example, each zone ID may be N bits long, such as 12 bits, and the numbering may wrap around. Based on the zone ID, a sidelink device may indicate a geographical area to another sidelink device based on one or more zone IDs associated with the geographical area. For example, if a first sidelink device is indicating or referring the geographical area covered by the squares 508, 512 and 516 to a second sidelink device, the first sidelink device may indicate the first zone ID 510, the second zone ID 514 and the third zone ID 518 to the second sidelink device. For purpose of the present disclosure, the zone ID that is used in association with sidelink communications may be referred to as "sidelink zone ID."

In one example, a sidelink device (e.g., a UE) may determine a zone ID (e.g., an identity of a zone) in which the sidelink device is located based on the following formulae, if a sidelink zone (e.g., sl-ZoneConfig) is configured:

$$x_1 = \text{Floor}(x/L) \text{Mod } 64;$$

$$y_1 = \text{Floor}(y/L) \text{Mod } 64;$$

$$\text{Zone\_id} = y_1 * 64 + x_1.$$

where L may represent the value of sl-ZoneLength (e.g., the sidelink zone length 506) included in the sl-ZoneConfig, x may represent the geodesic distance in longitude between the sidelink device's current location and the geographical coordinates (0, 0) according to a World Geodetic System 84 (WGS84) model, which may be expressed in meters; and y may represent the geodesic distance in latitude between the sidelink device's current location and the geographical coordinates (0, 0) according to the WGS84 model, which may be expressed in meters.

Figure 6:
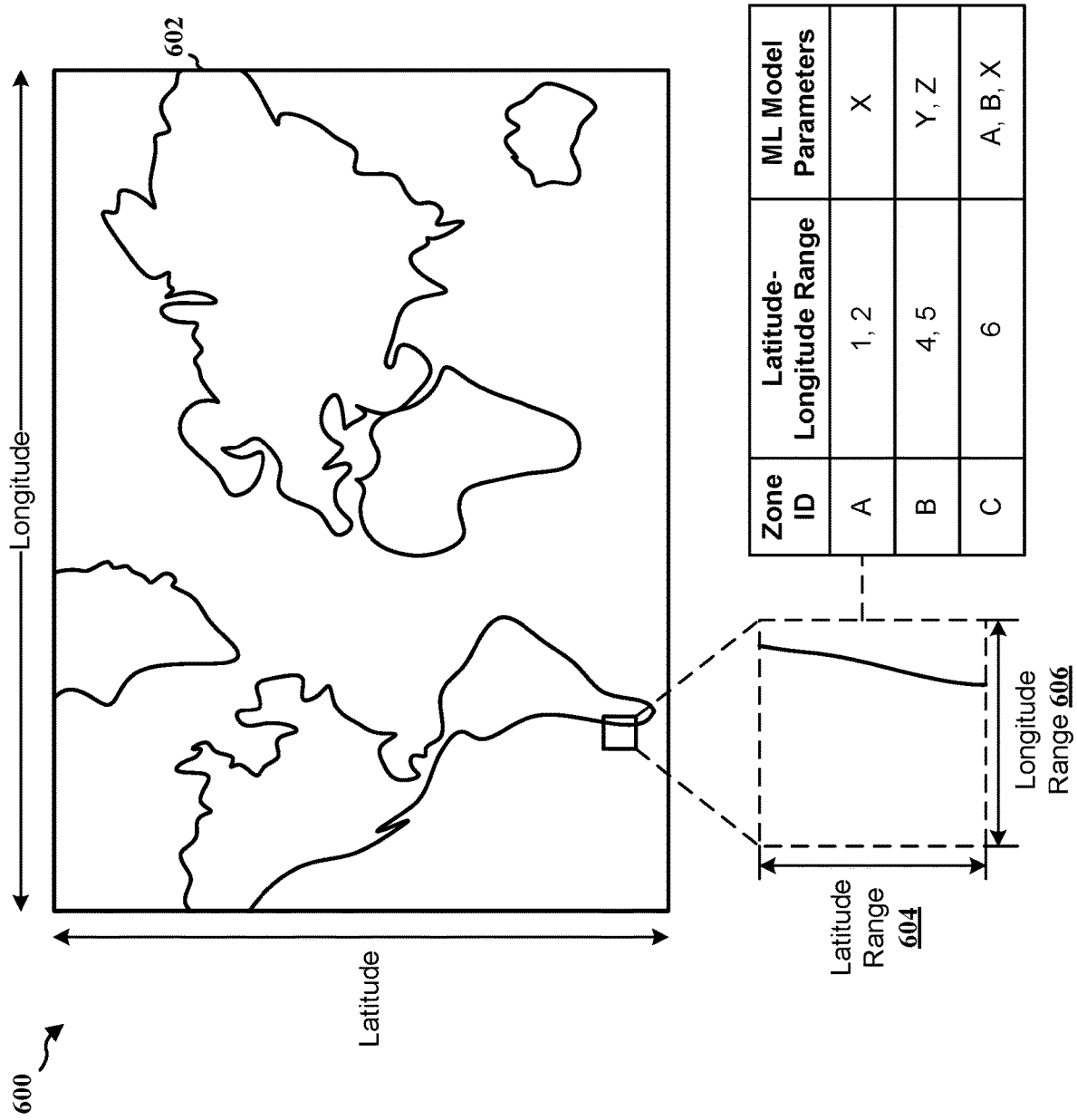
FIG. 6 is a diagram illustrating an example of identifying a geographical area based on a zone ID that is associated with a longitude-latitude range.

In another example, a UE and/or a base station may identify a geographical area/zone in a wireless communication based on a zone ID that is associated with a longitude-latitude range. FIG. 6 is a diagram 600 illustrating an example of identifying a geographical area based on a zone ID that is associated with a longitude-latitude range. In one example, for a first UE to identify its geographical area or to indicate a geographical area to a second UE or a base station, the first UE may indicate a latitude range 604 (e.g., latitude 31° to 32°) and a longitude range 606 (e.g., longitude −135° to)−145° of the geographical area on the earth 602. Similarly, a zone ID may be used in association with a defined longitude-latitude range of a geographical area, such that a UE and/or a base station may indicate the geographical area based on the zone ID. For example, a first zone ID may be associated with a first longitude-latitude range, a second zone ID may be associated with a second longitude-latitude range, a third zone ID may be associated with a third longitude-latitude range, etc.

The training procedure for neural networks may be a resource-consuming process, one of the ways to reduce the burden of the training may be based on "model sharing". For example, if a base station has gone through training a neural network with a first UE (e.g., UE 1), the first UE may upload/share the trained neural network (e.g., the trained ML model and/or ML model parameters) to the base station, and then the base station may transmit/share information about the trained neural network (e.g., trained neural network parameters) with a second UE (e.g., UE 2). The first UE may also transmit the trained neural network to the second UE directly. As such, if the trained neural network from the first UE is at least in part applicable to the second UE, the second UE may use the trained neural network information instead of starting the training process from the beginning or from scratch, which may reduce the time for the neural network training at the second UE.

Aspects presented herein may improve the efficiency of neural network training that may be specific to a particular geographic area, where neural network devices (e.g., UEs) may share information about their trained neural networks based on their locations. For example, a neural network device may share one or more trained ML models and/or one or more parameters of a trained ML model with another neural network device, such as a base station or another UE, based at least in part on a zone ID that is associated with the neural network device and/or based at least in part on a geographical area in which the neural network device is located. In some aspects, the UE may share the trained ML model and/or ML parameters with position information for the UE. The device receiving the ML model information from the UE (e.g., a base station and/or a second UE) may determine the zone ID to which the ML model information applies based on the position information received from the UE. In some aspects, the position information may include the zone ID. In other aspects, the UE may indication its position in another manner. In one aspect, one or more neural network devices may provide neural network model (e.g., trained ML model and/or parameters) sharing across nodes with other neural network devices in an area by indicating an applicable zone ID when sharing trained a trained ML mode or ML model parameters that are applicable for a particular zone.

In one aspect of the present disclosure, as some neural networks and/or some of their corresponding parameters may be dependent upon the environment (e.g., the geographical location) that they are deployed in, a neural network device may share or apply a trained neural network based on its geographical location, where the neural network device may identify and share its geographical location based at least in part on one or more zone IDs associated with the geographical location, e.g., as described in connection with FIGS. 5 and 6. For example, there may be at least two options for applying machine learning based on zone ID. In one example, as described in connection with FIG. 5, each zone ID may correspond to a sidelink zone ID that is used by neural network devices to indicate geographical location defined in connection with sidelink communications (e.g., squares 504). In another example, as described in connection with FIG. 6, the zone ID may be associated with a geographical location based on the latitude-longitude range for the geographical area. Thus, a neural network may apply machine learning to the neural network devices based on their geographical location(s) and/or zone ID(s) that are associated with the one or more neural network devices.

Figure 7:
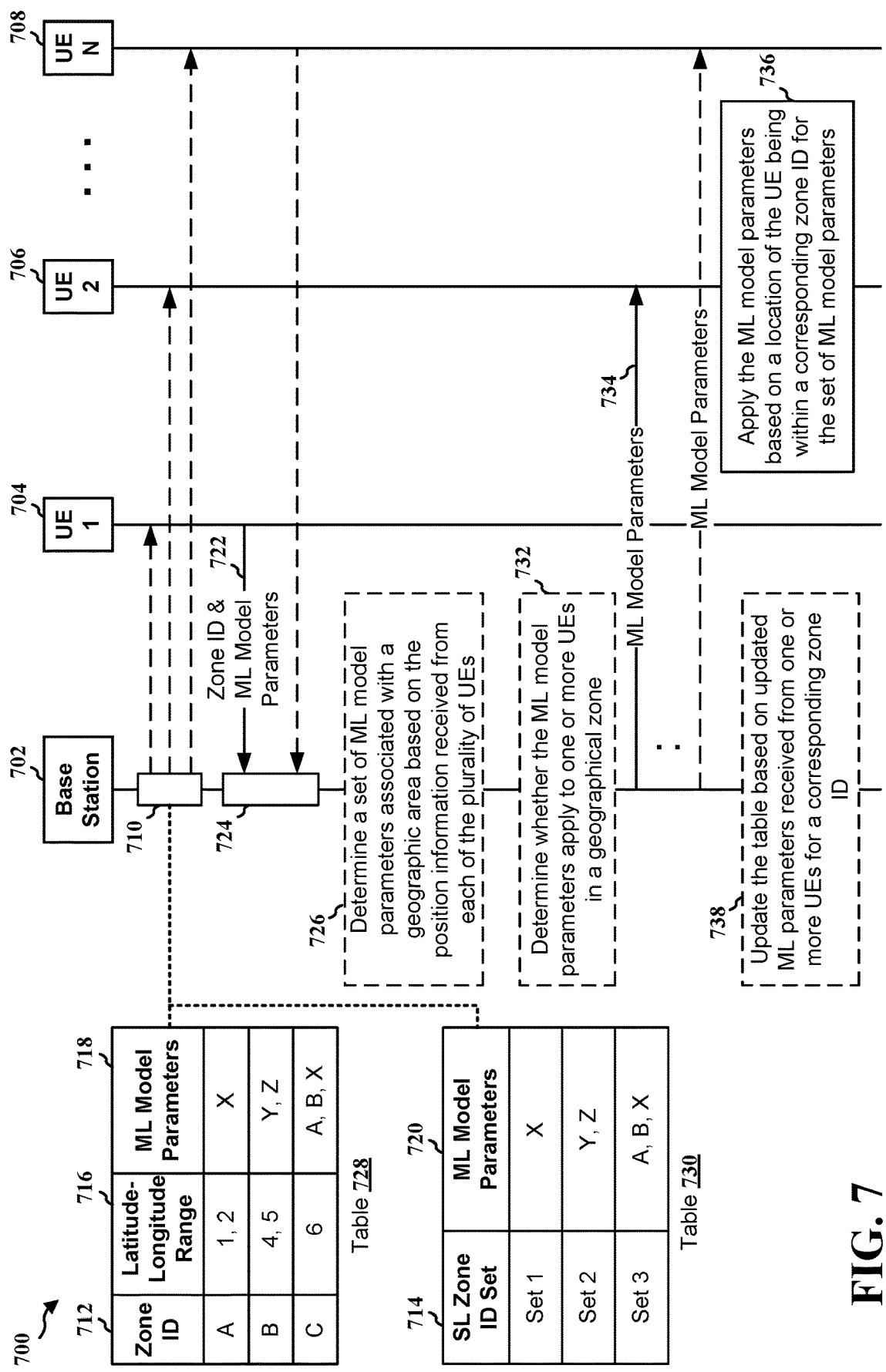
FIG. 7 is a communication flow illustrating an example of an ML model updating based on zone ID according to aspects of the present disclosure.

FIG. 7 is a communication flow 700 illustrating an example of an ML model updating based on zone ID according to aspects of the present disclosure. Optional aspects may be illustrated in dashed line. In one aspect, at 710, a base station 702 may transmit multiple zone IDs 712 or multiple sidelink zone IDs or sets of sidelink zone IDs 714 to one or more UEs, such as a first UE 704, a second UE 706 and up to $N^{th}$ UE 708. In one example, as described in connection with FIG. 6, each of the multiple zone IDs 712 may be associated with or identifies a geographical zone based on a latitude-longitude range 716, and each of the multiple zone IDs 712 may be associated with one or more ML model parameters 718. For example, the base station 702 may transmit/broadcast a Table 728 that indicates a first zone ID (e.g., Zone ID A) is associated with a first latitude-longitude range and an ML model parameter X, a second zone ID (e.g., Zone ID B) is associated with a second latitude-longitude range and ML model parameters Y and Z, and a third zone ID (e.g., Zone ID C) is associated with a third latitude-longitude range and ML model parameters A, B and Z, etc. In another example, as described in connection with FIG. 5, each of the multiple sidelink zone IDs or sets of sidelink zone IDs 714 may be associated with or identifies a geographical zone (e.g., squares 504) defined based on a sidelink communication, and each of the multiple sidelink zone IDs or sets of sidelink zone IDs 714 may also be associated with one or more ML model parameters 720. For example, the base station 702 may transmit/broadcast a Table 730 that indicates a first sidelink zone ID or a first set of sidelink zone IDs (e.g., Set 1) is associated with an ML model parameter X, a second sidelink zone ID or a second set of sidelink zone IDs (e.g., Set 2) is associated with ML model parameters Y and Z, and a third sidelink zone ID or a third set of sidelink zone IDs (e.g., Set 3) is associated with ML model parameters A, B and Z, etc. In other words, each zone ID may identify a geographical zone and may be associated with one or more corresponding ML models and/or ML model parameters, where the corresponding ML model and/or ML model parameters may be dependent on the geographical zone.

Based on receiving the zone IDs 712 and/or the sidelink zone IDs or the sets of sidelink zone IDs 714 (collectively referred as "zone IDs 712/714" hereafter) and their associated ML model parameters 718/720 from the base station 702, such as via the Table 728 and/or the Table 730, one or more UEs may respond to the base station 702 if they are within a geographical area associated with at least one of the zone IDs 712/714, and that one or more ML model parameters 718/720 associated with the zone IDs 712/714 also apply to them. For example, at 722, the first UE 704 may be within a geographical area that is associated with the zone ID B, as indicated by the Table 728, and the first UE 704 may have a trained neural network that includes at least one of ML model parameters Y and Z that is associated with the geographical area and/or the zone ID B. Thus, the first UE 704 may transmit its location information (e.g., the zone ID B) and the trained ML model parameters Y and/or Z to the base station 702. The location information may be based on the latitude/longitude range, as described in connection with FIG. 6, or it may be based on zones defined by a sidelink communication, as described in connection with FIG. 5.

At 724, the base station 702 may receive, from one or more UEs, location information (e.g., one or more of zone IDs 712/714) in which the one or more UEs are located and one or more ML model parameters 718/720 (e.g., trained neural network parameters) that are associated with the location and/or zone ID(s) of the one or more UEs. For example, the base station 702 may receive zone ID(s) and their associated ML model parameters from the first UE 704, such as shown at 722, and from the $N^{th}$ UE 708, etc.

At 726, after the base station 702 receives zone ID(s) and their associated ML model parameters from one or more UEs, such as the first UE 704 and/or the $N^{th}$ UE 708, the base station 702 may determine one or more sets of ML model parameters associated with one or more geographic areas. For example, after the base station 702 receives the zone ID and the associated ML model parameters from the first UE 704 at 722, the base station 702 may determine ML model parameters associated with the geographic area identified by the zone ID, which may be an area in which the first UE 704 is located. As such, the base station 702 may further determine that the set of ML model parameters associated with the geographic area based on a correlation of the set of ML model parameters received from one or more UEs located within the geographic area.

At 732, in some examples, the base station 702 may optionally determine whether the ML model parameters received from one or more UEs may apply to other UE(s) in geographical zone(s) that are associated with the one or more UEs. For example, after receiving the zone ID and associated ML model parameters from the first UE 704, the base station 702 may determine whether the received ML model parameters are applicable to one or more UEs in a geographical zone in which the first UE 704 is located and/or in a geographical zone identified by the zone ID. For example, the base station 702 may determine that the second UE 706 is in a geographical zone in which the first UE 704 is located and/or in a geographical zone identified by the zone ID (e.g., zone ID B), and the base station 702 may also determine that one or more ML model parameters received from the first UE 704 may apply to the neural network training at the second UE 706.

At 734, the base station 702 may provide/share one or more ML model parameters received from one or more UEs to other UEs, such as UEs in which one or more ML model parameters may apply and/or UEs that have requested ML model update, etc. For example, after determining that the one or more ML model parameters received from the first UE 704 are applicable to the second UE 706 and that the second UE 706 is in a geographical zone in which the first UE 704 is located or in a geographical zone identified by the zone ID provided by the first UE 704 (e.g., zone ID B), the base station 702 may provide/share the one or more ML model parameters received from the first UE 704 to the second UE 706.

As illustrated at 732, it may be optional for the base station 702 to determine whether the ML model parameters received from one or more UEs may apply to other UEs. Thus, in some examples, after receiving ML model parameters from a transmitting UE, the base station 702 may broadcast/transmit the ML model parameters (e.g., with their associated zone ID(s)) to one or more receiving UEs in a geographical area in which the transmitting UE is located or in a geographical area identified by the transmitting UE's zone ID without determining whether the ML model parameters are applicable to the receiving UEs in the geographical area.

At 736, if a receiving UE receives the transmitted/broadcasted ML model parameter, the receiving UE may determine whether the ML model parameters are applicable to the receiving UE and/or the receiving UE may apply the transmitted/broadcasted ML model parameters. For example, after the second UE 706 receives the ML model parameters from the base station 702, the second UE 706 may apply the ML model parameters received after determining they are applicable to the second UE 706. As such, the second UE 706 may apply the received ML model parameters, or may determine that the received ML model parameters are applicable to it, based at least in part on the location of the second UE 706 being within the corresponding zone ID for the set of ML model parameters (e.g., within the zone ID B that is associated with ML model parameters Y and Z). In some examples, if the second UE 706 moves to another geographical zone that is associated with a different zone ID (e.g., zone ID A), the second UE 706 may apply another set of ML model parameters (e.g., ML model parameters X) that corresponds to the new zone ID. In other examples, through keeping track of the position of the one or more UEs that share their trained neural networks, the base station 702 may empirically come up with a set of positions (zones) that the trained neural networks from the one or more UEs are similar.

At 738, the base station 702 may update ML model parameters received from one or more UEs for a corresponding zone ID if applicable. For example, at 722, the base station 702 may receive one or more new or modified ML parameters from the first UE 704 that are different from the ML model parameters indicated/stored by the Table 728. As such, the base station 702 may update the ML model parameters in the Table 728 based on the one or more ML parameters from the first UE 704. Then, the base station 702 may transmit/share the updated ML parameters with other UEs, such as by transmitting the updated Table 728 to the other UEs.

In another aspect of the present disclosure, a UE may share its trained neural network (e.g., trained ML model(s) and/or ML model parameters) directly with other UE(s), such as via sidelink communications.

Figure 8:
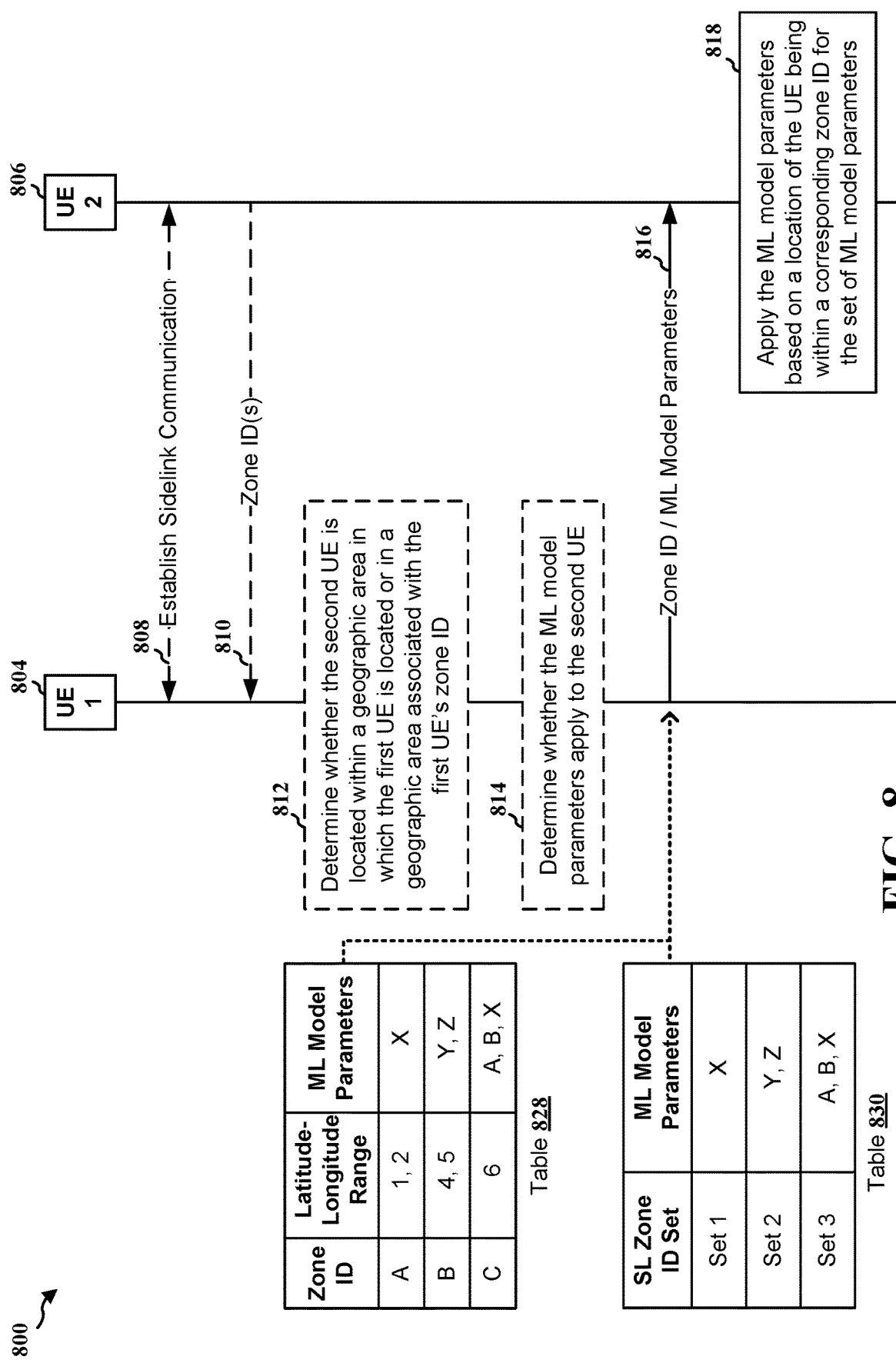
FIG. 8 is a communication flow illustrating an example of an ML model updating based on zone ID between UEs according to aspects of the present disclosure.

FIG. 8 is a communication flow 800 illustrating an example of an ML model updating based on zone ID between UEs according to aspects of the present disclosure. Optional aspects may be illustrated in dashed line. At 808, a first UE 804 may establish a sidelink communication with a second UE 806, where the first UE may be a neural network device with trained ML model(s) and/or trained ML model parameter(s).

In one aspect, as shown at 810, the first UE 804 may receive, from the second UE 806, one or more zone IDs that are associated with the second UE 806. At 812, based on the received zone IDs, the first UE 804 may determine whether the second UE 806 is located within a geographic area in which the first UE 804 is located or in a geographic area associated with the first UE's zone ID. At 814, the first UE 804 may optionally determine whether its trained ML model and/or ML model parameters are applicable to the second UE 806. If the first UE 804 determines that the trained ML model and/or ML model parameters are applicable to the second UE 806, at 816, the first UE 804 may transmit its trained ML model and/or ML model parameters to the second UE 806 via the sidelink communication.

In another aspect, as an alternative, the first UE 804 may transmit/broadcast its trained ML model and/or ML model parameters with the associated zone ID(s) to one or more receiving UEs including the second UE 806 without determining whether the one or more receiving UEs are located in a geographic area in which the first UE 804 is located or in a geographic area associated with the first UE's zone ID, and/or without determining whether its trained ML model and/or ML model parameters are applicable to the one or more receiving UEs.

In one example, the first UE 804 may maintain a table, such as a Table 828 (e.g., for zone IDs associated with latitude-longitude range) and/or a Table 830 (e.g., for zone IDs associated with geographic areas defined by sidelink communication), that includes one or more trained ML model parameters and their associated zone ID(s). Thus, at 816, the first UE 804 may transmit/broadcast the Table 828 and/or the Table 830 to the second UE 806. The first UE 804 and/or the second UE 806 may be configured to update its table when one or more ML model parameters are changed for a given zone. As such, in some examples, the first UE 804 and/or the second UE 806 may keep track of its zone ID to know which ML model parameters to use. The first UE 804 and/or the second UE 806 may also be configured to keep track of its zone ID during an idle-mode.

At 818, after the second UE 806 receives the trained ML model(s) and/or ML model parameter(s) from the first UE 804, such as via the Table 828 and/or the Table 830, the second UE 806 may determine whether the ML model parameters are applicable to the second UE 806, and the second UE 806 may apply the trained ML model(s) and/or ML model parameter(s) if they are applicable. In some examples, if the second UE 806 moves to another geographical zone that is associated with a different zone ID (e.g., zone ID A), the second UE 806 may apply another set of ML model parameters (e.g., ML model parameters X) that corresponds to the new zone ID.

Aspects presented herein may enable zone IDs to be associated with machine learnings, where each zone ID may have its own corresponding neural network configuration (ML parameters). As such, in some examples, a transition procedure may be defined for a neural network device (e.g., a UE with trained ML model(s) or ML model parameter(s)) when the neural network device is moving along different zone IDs. For example, a neural network device may be configured with a transition procedure that autonomously know to update the ML parameters when neural network device calculates or detects that the Zone ID has changed, where the new zone ID may have a different set of ML parameters according to the aforementioned tables (e.g., the Tables 728, 730, 828, 830).

Figure 9:
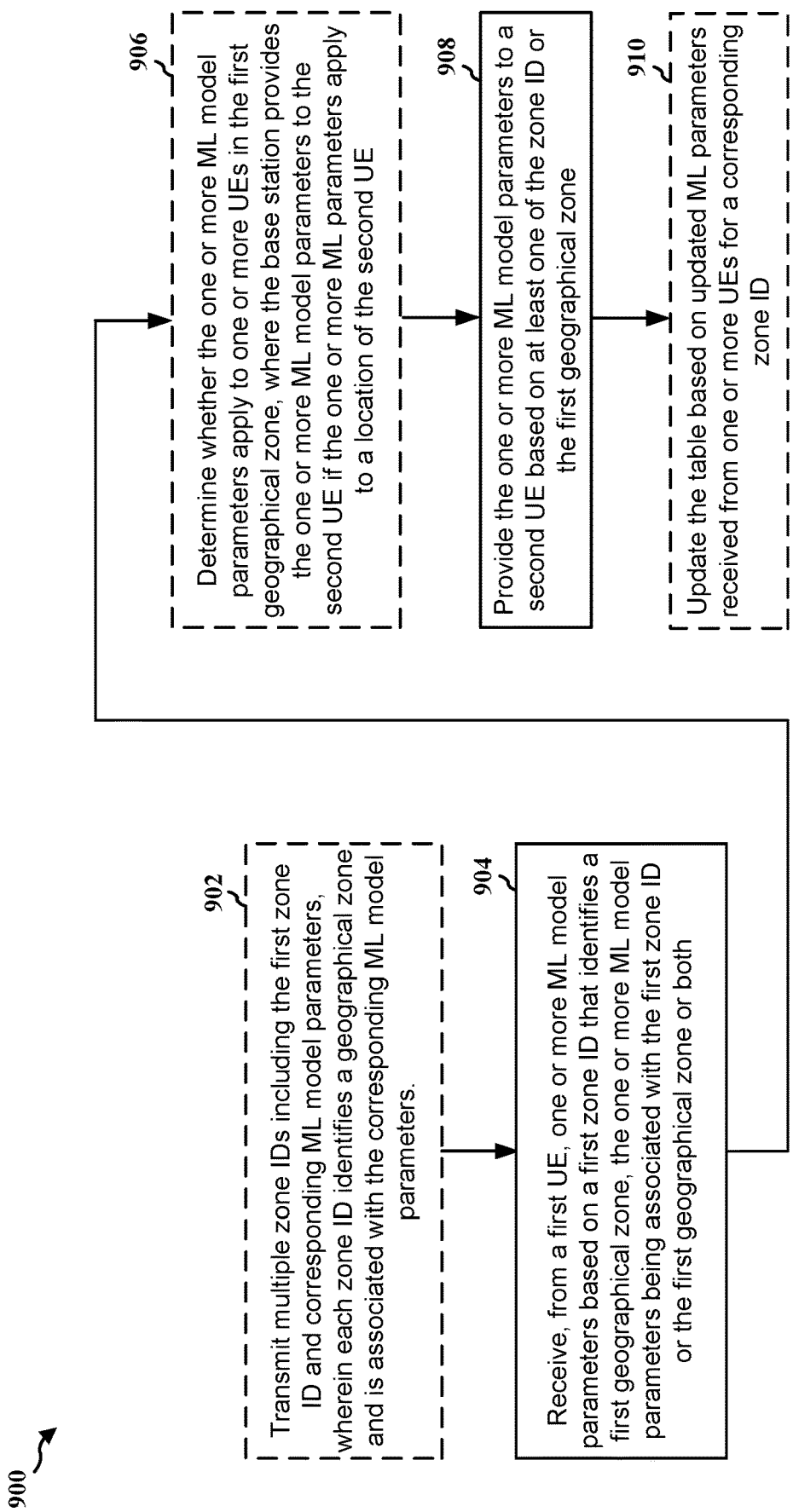
FIG. 9 is a flowchart of a method of wireless communication in accordance with aspects presented herein.

FIG. 9 is a flowchart 900 of a method of wireless communication. The method may be performed by a base station or a component of a base station (e.g., the base station 102, 180, 310, 402, 702; the apparatus 1002; a processing system, which may include the memory 376 and which may be the entire base station 310 or a component of the base station 310, such as the TX processor 316 the RX processor 370, and/or the controller/processor 375). Optional aspects are illustrated with a dashed line. The method may enable the base station to shared trained neural network (e.g., trained ML parameters) between UEs.

At 902, the base station may transmit multiple zone IDs including the first zone ID and corresponding ML model parameters, wherein each zone ID identifies a geographical zone and is associated with the corresponding ML model parameters, such as described in connection with FIG. 7. For example, at 710, the base station 702 may transmit multiple zone IDs 712 or multiple sidelink zone IDs or sets of sidelink zone IDs 714 to one or more UEs, such as a first UE 704, a second UE 706 and up to $N^{th}$ UE 708, where each of the multiple zone IDs 712 may be associated with or identifies a geographical zone based on a latitude-longitude range 716, and each of the multiple zone IDs 712 may be associated with one or more ML model parameters 718. The transmission of the zone ID and corresponding ML model parameters may be performed, e.g., by the zone ID and ML parameter transmission component 1040 and/or the transmission component 1034 of the apparatus 1002 in FIG. 10. As such, in one example, providing the one or more ML model parameters may include broadcasting the one or more ML model parameters with an indication of a corresponding zone ID. The one or more ML model parameters may be dependent upon the first geographical zone, and the one or more ML model parameters may be trained neural network parameters.

In one example, each of the multiple zone IDs may identify a geographical zone by a latitude/longitude range, such as described in connection with FIGS. 6 and 7. In another example, the multiple zone IDs may each include a sidelink zone ID, such as described in connection with FIGS. 5 and 7.

At 904, the base station may receive, from a first UE, one or more ML model parameters based on a first zone ID that identifies a first geographical zone, the one or more ML model parameters being associated with the first zone ID or the first geographical zone or both, such as described in connection with FIG. 7. For example, at 710, the base station 702 may receive one or more ML model parameters from one or more UEs, which includes a first zone ID that identifies a first geographical zone from the first UE 704. The reception of the ML model parameter may be performed, e.g., by the ML model reception component 1042 and/or the reception component 1030 of the apparatus 1002 in FIG. 10.

In one example, the base station may receive a set of ML model parameters and position information from each of a plurality of UEs, and the base station may determine a set of ML model parameters associated with a geographic area based on the position information received from each of the plurality of UEs. In such as example, the base station may further determine the set of ML model parameters associated with the geographic area based on a correlation of the set of ML model parameters received from one or more UEs located within the geographic area, such as described in connection with 726 of FIG. 7.

At 906, the base station may determine whether the one or more ML model parameters apply to one or more UEs in the first geographical zone, where the base station may provide the one or more ML model parameters to the second UE if the one or more ML parameters apply to a location of the second UE, such as described in connection with FIG. 7. For example, at 732, the base station 702 may determine whether the one or more ML model parameters apply to one or more UEs in a geographical zone. The determination of whether the one or more ML model parameters may apply to the one or more UEs may be performed, e.g., by the ML parameter application component 1044 of the apparatus 1002 in FIG. 10.

At 908, the base station may provide the one or more ML model parameters to a second UE based on at least one of the zone ID or the first geographical zone, such as described in connection with FIG. 7. For example, at 734, the base station 702 may transmit ML model parameters to the second UE 706 based on the zone ID or the geographical zone associated with the second UE 706 and the first UE 704. The transmission of the ML model parameters may be performed, e.g., by the ML model update component 1046 and/or the transmission component 1034 of the apparatus 1002 in FIG. 10.

In some examples, the base station may broadcast a table with the multiple zone IDs and the corresponding ML model parameters, such as described in connection with FIG. 7. For example, at 710, the base station 702 may transmit the Table 728 or the Table 730 to one or more UEs.

At 910, the base station may update the table based on updated ML parameters received from one or more UEs for a corresponding zone ID, such as described in connection with FIG. 7. For example, at 738, the base station 702 may update the Table 728 or the Table 730 based on the ML parameters received from the first UE 704. The update of the table may be performed, e.g., by the ML table update component 1048 of the apparatus 1002 in FIG. 10.

Figure 10:
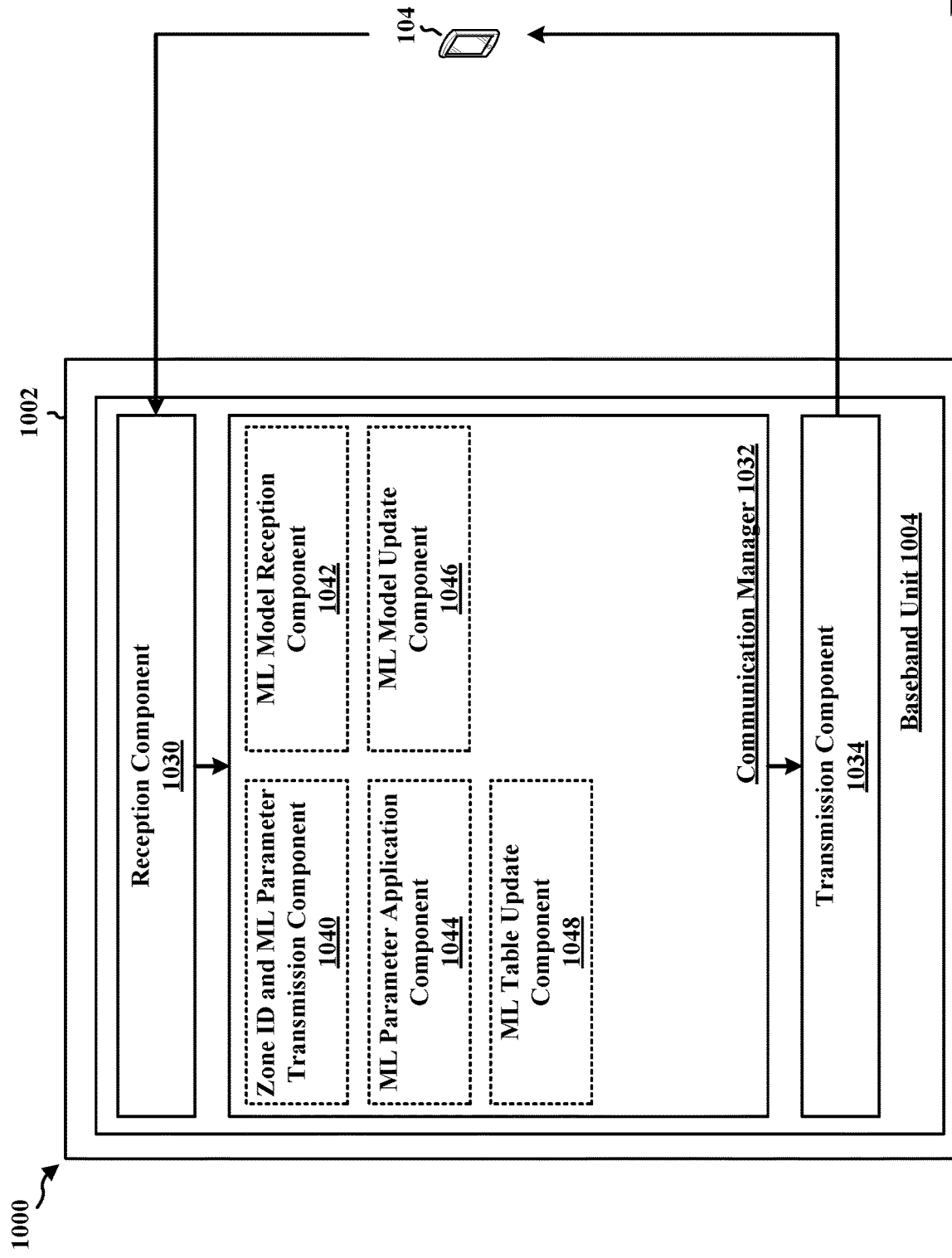
FIG. 10 is a diagram illustrating an example of a hardware implementation for an example apparatus in accordance with aspects presented herein.

FIG. 10 is a diagram 1000 illustrating an example of a hardware implementation for an apparatus 1002. The apparatus 1002 is a BS and includes a baseband unit 1004. The baseband unit 1004 may communicate through a cellular RF transceiver with the UE 104. The baseband unit 1004 may include a computer-readable medium/memory. The baseband unit 1004 is responsible for general processing, including the execution of software stored on the computer-readable medium/memory. The software, when executed by the baseband unit 1004, causes the baseband unit 1004 to perform the various functions described supra. The computer-readable medium/memory may also be used for storing data that is manipulated by the baseband unit 1004 when executing software. The baseband unit 1004 further includes a reception component 1030, a communication manager 1032, and a transmission component 1034. The communication manager 1032 includes the one or more illustrated components. The components within the communication manager 1032 may be stored in the computer-readable medium/memory and/or configured as hardware within the baseband unit 1004. The baseband unit 1004 may be a component of the BS 310 and may include the memory 376 and/or at least one of the TX processor 316, the RX processor 370, and the controller/processor 375.

The communication manager 1032 includes a zone ID and ML parameter transmission component 1040 that is configured to transmit multiple zone IDs including the first zone ID and corresponding ML model parameters, wherein each zone ID identifies a geographical zone and is associated with the corresponding ML model parameters, e.g., as described in connection with 902 of FIG. 9. The communication manager 1032 further includes an ML model reception component 1042 that is configured to receive, from a first UE, one or more ML model parameters based on a first zone ID that identifies a first geographical zone, the one or more ML model parameters being associated with the first zone ID or the first geographical zone or both, e.g., as described in connection with 904 of FIG. 9. The communication manager 1032 may further include an ML parameter application component 1044 that is configured determine whether the one or more ML model parameters apply to one or more UEs in the first geographical zone, where the base station provides the one or more ML model parameters to the second UE if the one or more ML parameters apply to a location of the second UE, e.g., as described in connection with 906 of FIG. 9. The communication manager 1032 may further include an ML model update component 1046 that is configured to provide the one or more ML model parameters to a second UE based on at least one of the zone ID or the first geographical zone, e.g., as described in connection with 908 of FIG. 9. The communication manager 1032 may further include an ML table update component 1048 that is configured to update the table based on updated ML parameters received from one or more UEs for a corresponding zone ID, e.g., as described in connection with 910 of FIG. 9.

The apparatus may include additional components that perform each of the blocks of the algorithm in the aforementioned flowchart of FIG. 9. As such, each block in the aforementioned flowchart of FIG. 9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1002, and in particular the baseband unit 1004, includes means for transmitting multiple zone IDs including the first zone ID and corresponding ML model parameters, wherein each zone ID identifies a geographical zone and is associated with the corresponding ML model parameters. (e.g., the zone ID and ML parameter transmission component 1040 and/or the transmission component 1034). The apparatus 1002 includes means for receiving, from a first UE, one or more ML model parameters based on a first zone ID that identifies a first geographical zone, the one or more ML model parameters being associated with the first zone ID or the first geographical zone or both (e.g., the ML model reception component 1042 and/or the reception component 1030). The apparatus 1002 includes means for determining whether the one or more ML model parameters apply to one or more UEs in the first geographical zone, where the base station provides the one or more ML model parameters to the second UE if the one or more ML parameters apply to a location of the second UE (e.g., the ML parameter application component 1044). The apparatus 1002 includes means for providing the one or more ML model parameters to a second UE based on at least one of the zone ID or the first geographical zone (e.g., the ML model update component 1046 and/or the transmission component 1034). The apparatus 1002 includes means for updating the table based on updated ML parameters received from one or more UEs for a corresponding zone ID (e.g., the ML table update component 1048).

The aforementioned means may be one or more of the aforementioned components of the apparatus 1002 configured to perform the functions recited by the aforementioned means. As described supra, the apparatus 1002 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

Figure 11:
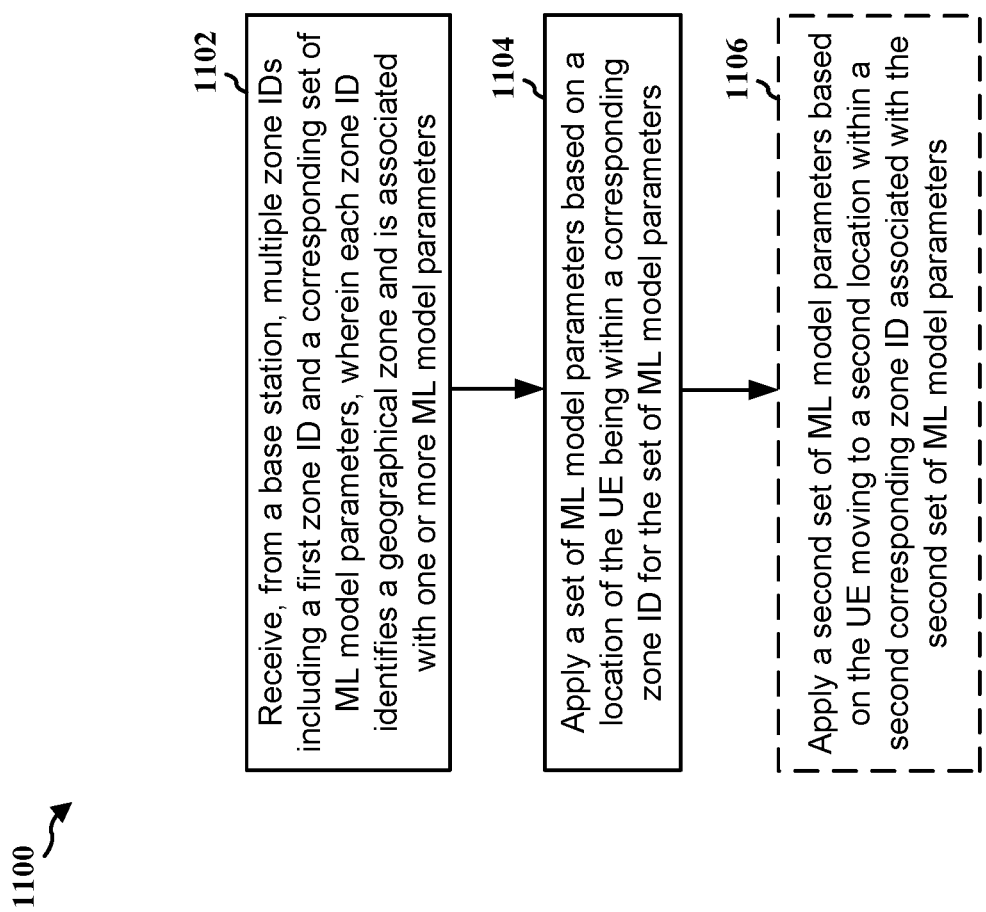
FIG. 11 is a flowchart of a method of wireless communication in accordance with aspects presented herein.

FIG. 11 is a flowchart 1100 of a method of wireless communication. The method may be performed by a UE or a component of a UE (e.g., the UE 104, 350, 404, 406, 704, 706, 708; the apparatus 1202; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to receive and update trained neural network provided by another UE.

At 1102, the UE may receive, from a base station, multiple zone IDs including a first zone ID and a corresponding set of ML model parameters, where each zone ID may identify a geographical zone and may be associated with one or more ML model parameters, such as described in connection with FIG. 7. For example, at 710 and 732, the second UE 706 may receive, from the base station 702, multiple zone IDs including a first zone ID and a corresponding set of ML model parameters. The reception of the multiple zone IDs and the corresponding set of ML model parameters may be performed, e.g., by the zone ID and ML parameter reception component 1240 and/or the reception component 1230 of the apparatus 1202 in FIG. 12. The one or more ML model parameters may be dependent upon the first geographical zone, and the one or more ML model parameters may be trained neural network parameters.

In one example, each of the multiple zone IDs may identify a geographical zone by a latitude/longitude range, such as described in connection with FIGS. 6 and 7. In another example, the multiple zone IDs may each include a sidelink zone ID, such as described in connection with FIGS. 5 and 7.

At 1104, the UE may apply a set of ML model parameters based on a location of the UE being within a corresponding zone ID for the set of ML model parameters, such as described in connection with FIG. 7. For example, at 736, the second UE 706 may apply the ML model parameters based on the location of the second UE 706 being within a corresponding zone ID for the set of ML model parameters associated with the first UE 704. The application of the ML model parameters may be performed, e.g., by the ML model update component 1242 of the apparatus 1202 in FIG. 12.

At 1106, the UE may apply a second set of ML model parameters based on the UE moving to a second location within a second corresponding zone ID associated with the second set of ML model parameters, such as described in connection with FIG. 7. The application of the second set of ML model parameters may be performed, e.g., by the ML model update component 1242 and/or the ML model change detection component 1244 of the apparatus 1202 in FIG. 12.

Figure 12:
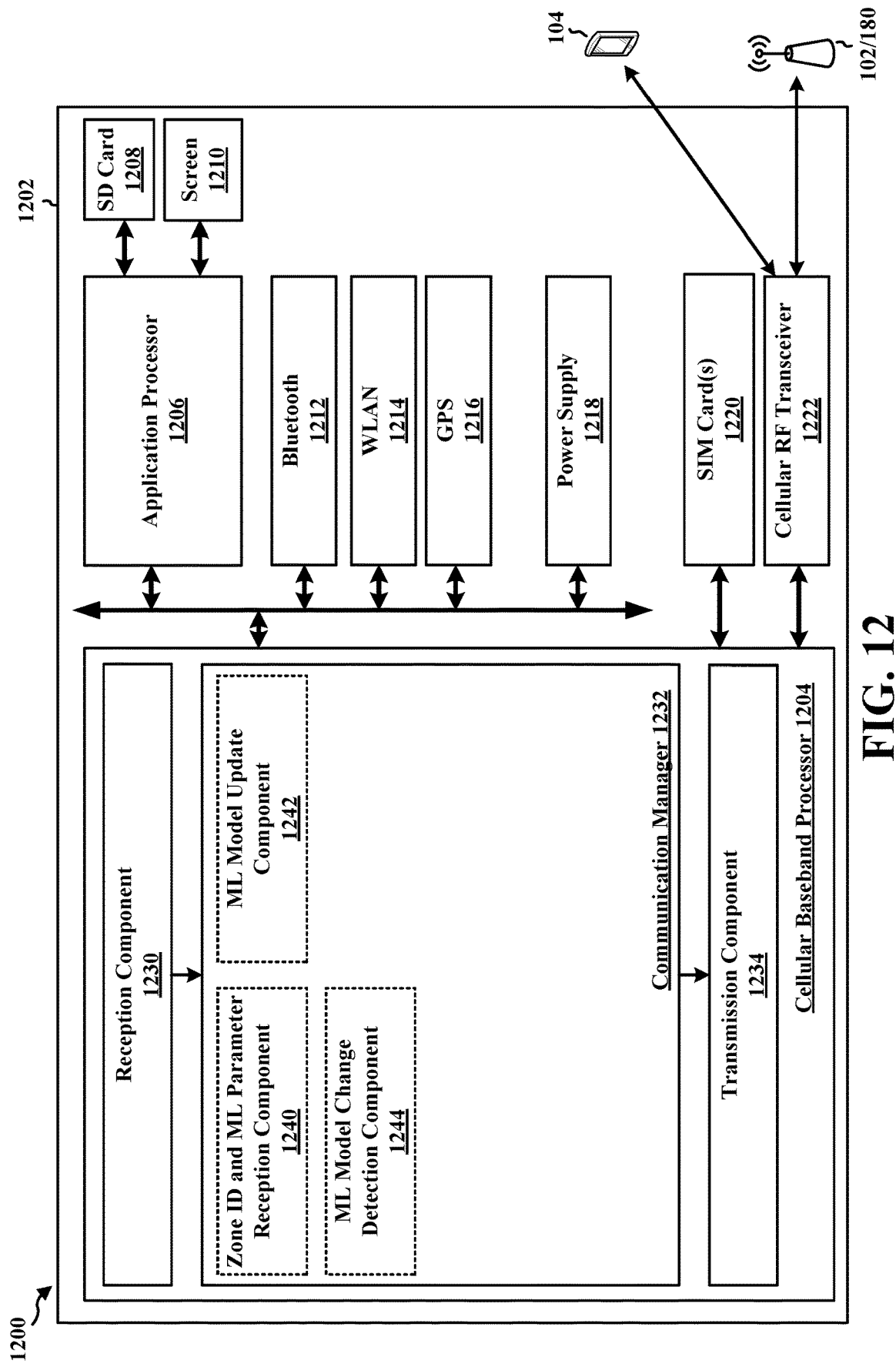
FIG. 12 is a diagram illustrating an example of a hardware implementation for an example apparatus in accordance with aspects presented herein.

FIG. 12 is a diagram 1200 illustrating an example of a hardware implementation for an apparatus 1202. The apparatus 1202 is a UE and includes a cellular baseband processor 1204 (also referred to as a modem) coupled to a cellular RF transceiver 1222 and one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, and a power supply 1218. The cellular baseband processor 1204 communicates through the cellular RF transceiver 1222 with the UE 104 and/or BS 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. The cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the aforediscussed additional modules of the apparatus 1202.

The communication manager 1232 includes a zone ID and ML parameter reception component 1240 that is configured to receive, from a base station, multiple zone IDs including a first zone ID and a corresponding set of ML model parameters, wherein each zone ID identifies a geographical zone and is associated with one or more ML model parameters, e.g., as described in connection with 1102 of FIG. 11. The communication manager 1232 further includes an ML model update component 1242 that is configured to apply a set of ML model parameters based on a location of the UE being within a corresponding zone ID for the set of ML model parameters, e.g., as described in connection with 1104 of FIG. 11. The communication manager 1232 further includes an ML model change detection component 1244 that is configured to apply a second set of ML model parameters based on the UE moving to a second location within a second corresponding zone ID associated with the second set of ML model parameters, e.g., as described in connection with 1106 of FIG. 11.

The apparatus may include additional components that perform each of the blocks of the algorithm in the aforementioned flowchart of FIG. 11. As such, each block in the aforementioned flowchart of FIG. 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1202, and in particular the cellular baseband processor 1204, includes means for receiving, from a base station, multiple zone IDs including a first zone ID and a corresponding set of ML model parameters, wherein each zone ID identifies a geographical zone and is associated with one or more ML model parameters (e.g., the zone ID and ML parameter reception component 1240 and/or the reception component 1230). The apparatus 1202 includes means for applying a set of ML model parameters based on a location of the UE being within a corresponding zone ID for the set of ML model parameters (e.g., the ML model update component 1242). The apparatus 1202 includes means for applying a second set of ML model parameters based on the UE moving to a second location within a second corresponding zone ID associated with the second set of ML model parameters (e.g., the ML model update component 1242 and/or the ML model change detection component 1244).

The aforementioned means may be one or more of the aforementioned components of the apparatus 1202 configured to perform the functions recited by the aforementioned means. As described supra, the apparatus 1202 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 13:
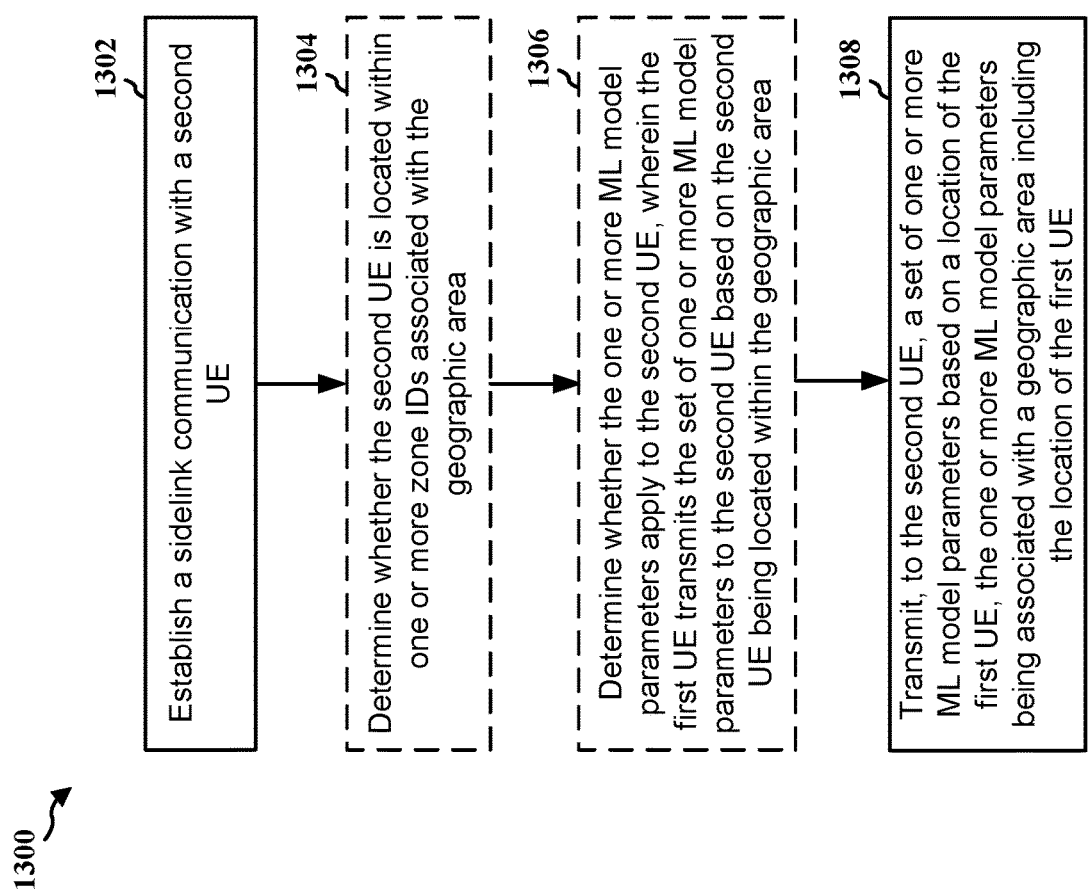
FIG. 13 is a flowchart of a method of wireless communication in accordance with aspects presented herein.

FIG. 13 is a flowchart 1300 of a method of wireless communication. The method may be performed by a UE or a component of a UE (e.g., the UE 104, 350, 404, 406, 704, 706, 708, 804, 806; the apparatus 1402; a processing system, which may include the memory 360 and which may be the entire UE 350 or a component of the UE 350, such as the TX processor 368, the RX processor 356, and/or the controller/processor 359). Optional aspects are illustrated with a dashed line. The method may enable the UE to transmit trained neural network to another UE.

At 1302, the UE may establish a sidelink communication with a second UE, such as described in connection with FIG. 8. For example, at 808, the first UE 804 may establish a sidelink communication with the second UE 806. The establishment of the sidelink communication may be performed, e.g., by the sidelink communication component 1440, the reception component 1430 and/or the transmission component 1434 of the apparatus 1402 in FIG. 14.

At 1304, the UE may determine whether the second UE is located within one or more zone IDs associated with the geographic area, such as described in connection with FIG. 8. For example, at 812, the first UE 804 may determine whether the second UE 806 is located within a geographic area in which the first UE 804 is located or in a geographic area associated with the first UE's zone ID. The determination of whether the second UE is located within one or more zone IDs may be performed, e.g., by the zone determination component 1442 of the apparatus 1402 in FIG. 14.

At 1306, the UE may determine whether the one or more ML model parameters apply to the second UE, where the first UE transmits the set of one or more ML model parameters to the second UE based on the second UE being located within the geographic area, such as described in connection with FIG. 8. For example, at 814, the first UE 804 may determine whether the ML model parameters apply to the second UE 806. The determination of whether the one or more ML model parameters apply to the second UE may be performed, e.g., by the ML parameter determination component 1444 of the apparatus 1402 in FIG. 14. The one or more ML model parameters may be dependent upon the first geographical zone, and the one or more ML model parameters may be trained neural network parameters.

In one example, each of the multiple zone IDs may identify a geographical zone by a latitude/longitude range, such as described in connection with FIGS. 6 and 7. In another example, the multiple zone IDs may each include a sidelink zone ID, such as described in connection with FIGS. 5 and 7.

At 1308, the UE may transmit, to the second UE, a set of one or more ML model parameters based on a location of the first UE, the one or more ML model parameters being associated with a geographic area including the location of the first UE, such as described in connection with FIG. 8. For example, at 816, the first UE 804 may transmit a set of one or more ML model parameters to the second UE 806 based on the location of the second UE 806. The transmission of the set of one or more ML model parameters may be performed, e.g., by the ML model transmission component 1446 and/or the transmission component 1434 of the apparatus 1402 in FIG. 14.

Figure 14:
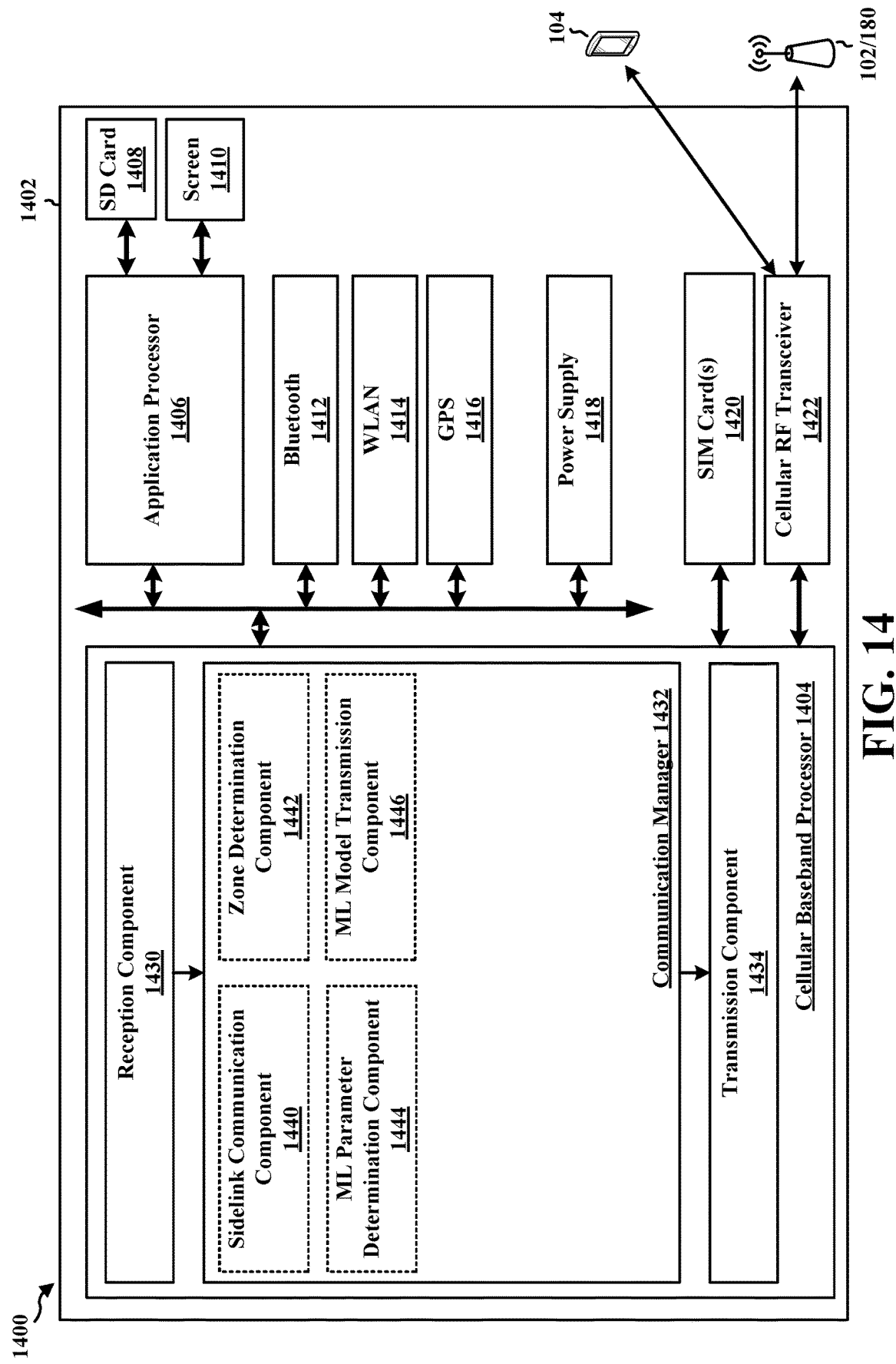
FIG. 14 is a diagram illustrating an example of a hardware implementation for an example apparatus in accordance with aspects presented herein.

FIG. 14 is a diagram 1400 illustrating an example of a hardware implementation for an apparatus 1402. The apparatus 1402 is a UE and includes a cellular baseband processor 1404 (also referred to as a modem) coupled to a cellular RF transceiver 1422 and one or more subscriber identity modules (SIM) cards 1420, an application processor 1406 coupled to a secure digital (SD) card 1408 and a screen 1410, a Bluetooth module 1412, a wireless local area network (WLAN) module 1414, a Global Positioning System (GPS) module 1416, and a power supply 1418. The cellular baseband processor 1404 communicates through the cellular RF transceiver 1422 with the UE 104 and/or BS 102/180. The cellular baseband processor 1404 may include a computer-readable medium/memory. The computer-readable medium/memory may be non-transitory. The cellular baseband processor 1404 is responsible for general processing, including the execution of software stored on the computer-readable medium/memory. The software, when executed by the cellular baseband processor 1404, causes the cellular baseband processor 1404 to perform the various functions described supra. The computer-readable medium/memory may also be used for storing data that is manipulated by the cellular baseband processor 1404 when executing software. The cellular baseband processor 1404 further includes a reception component 1430, a communication manager 1432, and a transmission component 1434. The communication manager 1432 includes the one or more illustrated components. The components within the communication manager 1432 may be stored in the computer-readable medium/memory and/or configured as hardware within the cellular baseband processor 1404. The cellular baseband processor 1404 may be a component of the UE 350 and may include the memory 360 and/or at least one of the TX processor 368, the RX processor 356, and the controller/processor 359. In one configuration, the apparatus 1402 may be a modem chip and include just the baseband processor 1404, and in another configuration, the apparatus 1402 may be the entire UE (e.g., see 350 of FIG. 3) and include the aforediscussed additional modules of the apparatus 1402.

The communication manager 1432 includes a sidelink communication component 1440 that is configured to establish a sidelink communication with a second UE, e.g., as described in connection with 1302 of FIG. 13. The communication manager 1432 further includes a zone determination component 1442 that is configured to determine whether the second UE is located within one or more zone IDs associated with the geographic area, e.g., as described in connection with 1304 of FIG. 13. The communication manager 1432 further includes an ML parameter determination component 1444 that is configured to determine whether the one or more ML model parameters apply to the second UE, where the first UE transmits the set of one or more ML model parameters to the second UE based on the second UE being located within the geographic area, e.g., as described in connection with 1306 of FIG. 13. The communication manager 1432 further includes an ML model transmission component 1446 that is configured to transmit, to the second UE, a set of one or more ML model parameters based on a location of the first UE, the one or more ML model parameters being associated with a geographic area including the location of the first UE, e.g., as described in connection with 1308 of FIG. 13.

The apparatus may include additional components that perform each of the blocks of the algorithm in the aforementioned flowchart of FIG. 13. As such, each block in the aforementioned flowchart of FIG. 13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1402, and in particular the cellular baseband processor 1404, includes means for establishing a sidelink communication with a second UE (e.g., the sidelink communication component 1440, the reception component 1430 and/or the transmission component 1434). The apparatus 1402 includes means for determining whether the second UE is located within one or more zone IDs associated with the geographic area (e.g., the zone determination component 1442). The apparatus 1402 includes means for determining whether the one or more ML model parameters apply to the second UE, where the first UE transmits the set of one or more ML model parameters to the second UE based on the second UE being located within the geographic area (e.g., the ML parameter determination component 1444). The apparatus 1402 includes means for transmitting, to the second UE, a set of one or more ML model parameters based on a location of the first UE, the one or more ML model parameters being associated with a geographic area including the location of the first UE (e.g., the ML model transmission component 1446 and/or the transmission component 1434).

The aforementioned means may be one or more of the aforementioned components of the apparatus 1402 configured to perform the functions recited by the aforementioned means. As described supra, the apparatus 1402 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 15:
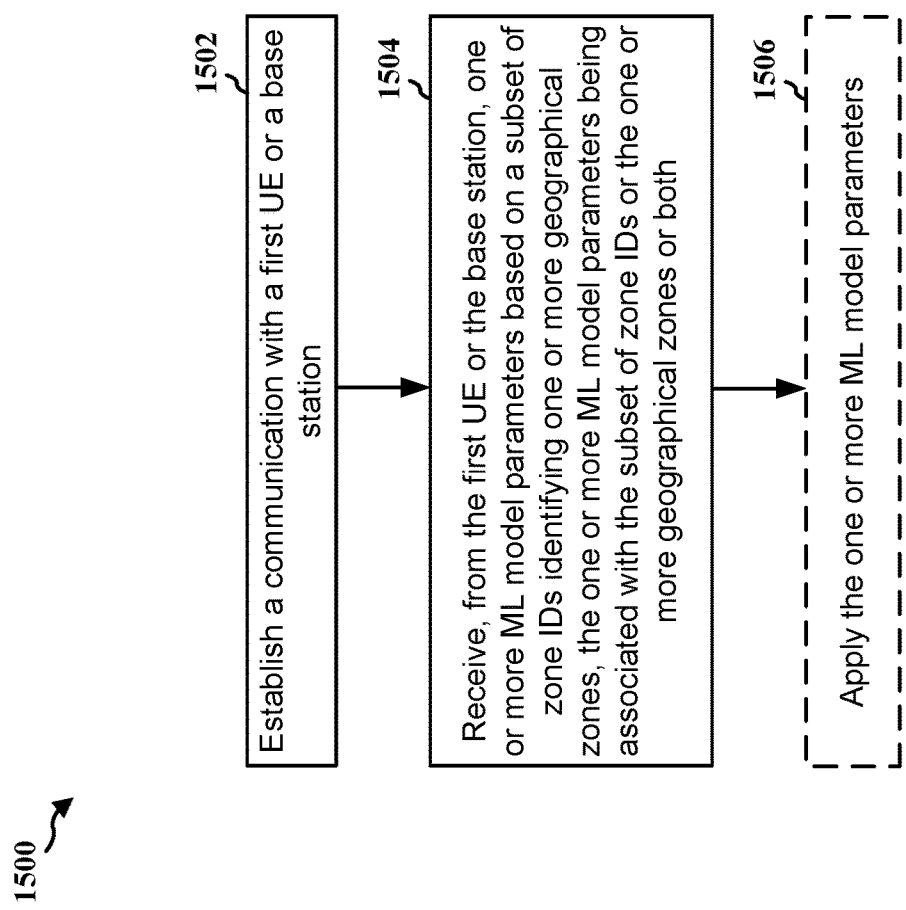
FIG. 15 is a flowchart of a method of wireless communication in accordance with aspects presented herein.

FIG. 15 is a flowchart 1500 of a method of wireless communication. The method may be performed by a UE or a component of a UE (e.g., the UE 104, 350, 404, 406, 704, 706, 708, 804, 806; the apparatus 1602; a processing system, which may include the memory 360 and which may be the entire UE 350 or a component of the UE 350, such as the TX processor 368, the RX processor 356, and/or the controller/ processor 359). Optional aspects are illustrated with a dashed line. The method may enable the UE to receive and apply trained neural network received from another UE or a base station.

At 1502, the UE may establish a communication with a first UE or a base station, such as described in connection with FIGS. 7 and 8. For example, at 808, the first UE 804 may establish a sidelink communication with the second UE 806. The establishment of the communication may be performed, e.g., by the communication component 1640, the reception component 1630 and/or the transmission component 1634 of the apparatus 1602 in FIG. 16.

At 1504, the UE may receive, from the first UE or the base station, one or more ML model parameters based on a subset of zone IDs identifying one or more geographical zones, the one or more ML model parameters being associated with the subset of zone IDs or the one or more geographical zones or both, such as described in connection with FIGS. 7 and 8. For example, at 734 of FIG. 7, the second UE 706 may receive ML model parameters form the base station 702, and at 816 of FIG. 8, the second UE 806 may receive ML model parameters from the first UE 804. The reception of ML model parameters may be performed, e.g., by the ML model reception component 1642 of the apparatus 1602 in FIG. 16. The UE may be associated with one or more zone IDs in the subset of zone IDs and the one or more ML model parameters apply to the second UE. The one or more ML model parameters may be dependent upon the first geographical zone, and the one or more ML model parameters may be trained neural network parameters.

In one example, each of the multiple zone IDs may identify a geographical zone by a latitude/longitude range, such as described in connection with FIGS. 6 and 7. In another example, the multiple zone IDs may each include a sidelink zone ID, such as described in connection with FIGS. 5 and 7.

At 1506, the UE may apply the one or more ML model parameters, such as described in connection with FIGS. 7 and 8. For example, at 736, the second UE 706 may apply the ML model parameters received, which may be based on a location of the UE being within a corresponding zone ID for the set of ML model parameters. The application of the one or more ML model parameters may be performed, e.g., by the ML model update component 1644 of the apparatus 1602 in FIG. 16.

Figure 16:
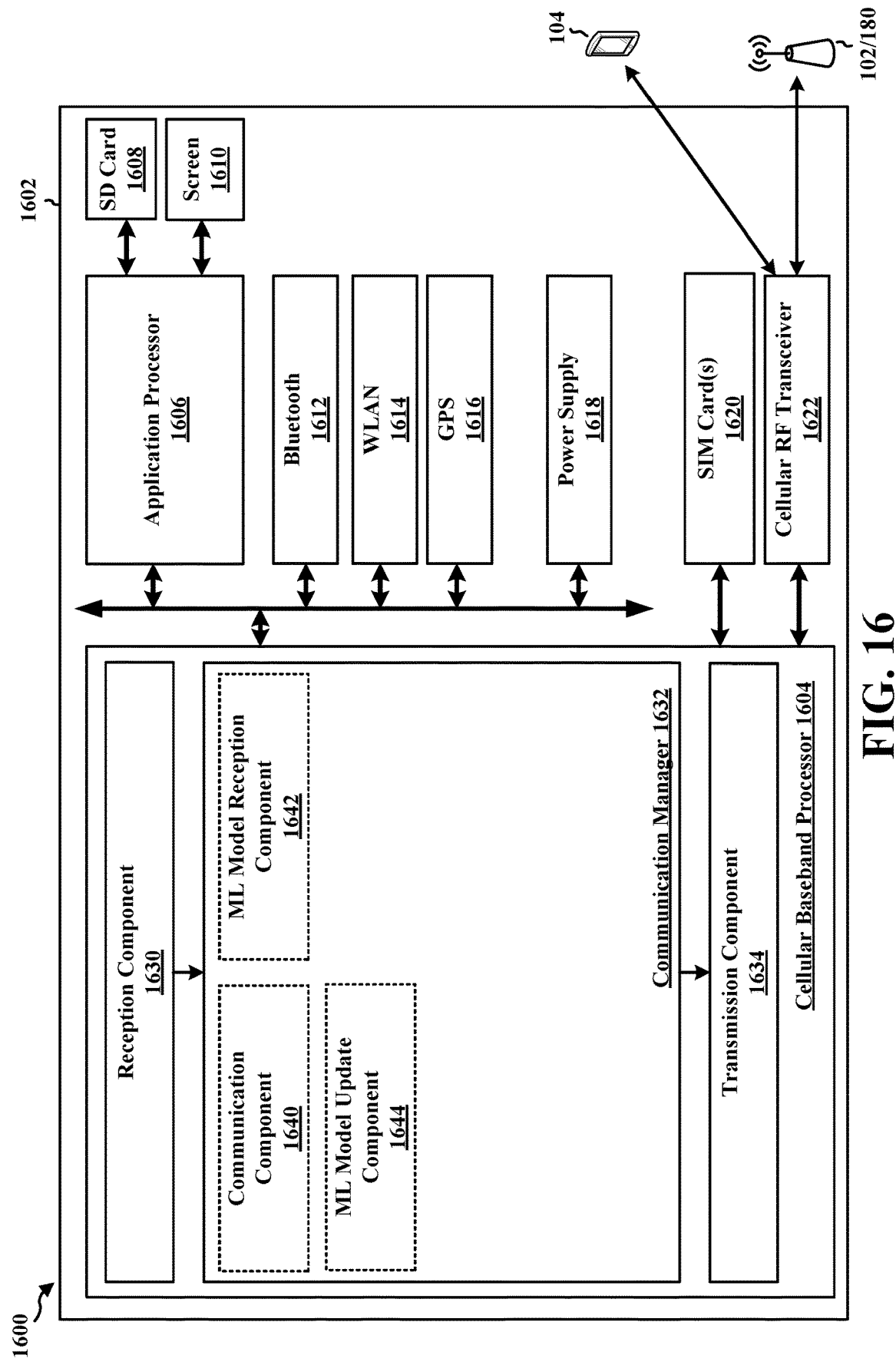
FIG. 16 is a diagram illustrating an example of a hardware implementation for an example apparatus in accordance with aspects presented herein.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/ memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/ processor 359. In one configuration, the apparatus 1602 may be a modem chip and include just the baseband processor 1604, and in another configuration, the apparatus 1602 may be the entire UE (e.g., see 350 of FIG. 3) and include the aforediscussed additional modules of the apparatus 1602.

The communication manager 1632 includes a communication component 1640 that is configured to establish a communication with a first UE or a base station, e.g., as described in connection with 1502 of FIG. 15. The communication manager 1632 further includes an ML model reception component 1642 that is configured to receive, from the first UE or the base station, one or more ML model parameters based on a subset of zone IDs identifying one or more geographical zones, the one or more ML model parameters being associated with the subset of zone IDs or the one or more geographical zones or both, e.g., as described in connection with 1504 of FIG. 15. The communication manager 1632 further includes an ML model update component 1644 that is configured to apply the one or more ML model parameters, e.g., as described in connection with 1506 of FIG. 15.

The apparatus may include additional components that perform each of the blocks of the algorithm in the aforementioned flowchart of FIG. 15. As such, each block in the aforementioned flowchart of FIG. 15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for establishing a communication with a first UE or a base station (e.g., the communication component 1640, the reception component 1630 and/or the transmission component 1634). The apparatus 1602 includes means for receiving, from the first UE or the base station, one or more ML model parameters based on a subset of zone IDs identifying one or more geographical zones, the one or more ML model parameters being associated with the subset of zone IDs or the one or more geographical zones or both (e.g., the ML model reception component 1642). The apparatus 1602 includes means for applying the one or more ML model parameters (e.g., ML model update component 1644).

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The following examples set forth additional aspects and are illustrative only and aspects thereof may be combined with aspects of other embodiments or teaching described herein, without limitation.

Aspect 1 is a method of wireless communication at a base station, comprising: receiving, from a first UE, one or more ML model parameters based on a first zone ID that identifies a first geographical zone, the one or more ML model parameters being associated with the first zone ID or the first geographical zone or both; and providing the one or more ML model parameters to a second UE based on at least one of the zone ID or the first geographical zone.

In aspect 2, the method of aspect 1 further comprises: determining whether the one or more ML model parameters apply to one or more UEs in the first geographical zone, wherein the base station provides the one or more ML model parameters to the second UE if the one or more ML parameters apply to a location of the second UE.

In aspect 3, the method of aspect 1 or aspect 2 further comprises: receiving a set of ML model parameters and position information from each of a plurality of UEs; and determining a set of ML model parameters associated with a geographic area based on the position information received from each of the plurality of UEs.

In aspect 4, the method of any of aspects 1-3 further includes that the base station further determines the set of ML model parameters associated with the geographic area based on a correlation of the set of ML model parameters received from one or more UEs located within the geographic area.

In aspect 5, the method of any of aspects 1-4 further includes that providing the one or more ML model parameters includes broadcasting the one or more ML model parameters with an indication of a corresponding zone ID.

In aspect 6, the method of any of aspects 1-5 further comprises: transmitting multiple zone IDs including the first zone ID and corresponding ML model parameters, wherein each zone ID identifies a geographical zone and is associated with the corresponding ML model parameters.

In aspect 7, the method of any of aspects 1-6 further includes that each of the multiple zone IDs identifies a geographical zone by a latitude/longitude range.

In aspect 8, the method of any of aspects 1-7 further includes that the multiple zone IDs each comprise a sidelink zone ID.

In aspect 9, the method of any of aspects 1-8 further includes that the base station broadcasts a table with the multiple zone IDs and the corresponding ML model parameters.

In aspect 10, the method of any of aspects 1-9 further comprises: updating the table based on updated ML parameters received from one or more UEs for a corresponding zone ID.

In aspect 11, the method of any of aspects 1-10 further includes that one or more ML model parameters are dependent upon the first geographical zone.

In aspect 12, the method of any of aspects 1-11 further includes that the one or more ML model parameters are trained neural network parameters.

Aspect 13 is an apparatus for wireless communication including at least one processor coupled to a memory and configured to implement a method as in any of aspects 1 to 12.

Aspect 14 is an apparatus for wireless communication including means for implementing a method as in any of aspects 1 to 12.

Aspect 15 is a non-transitory computer-readable medium storing computer executable code, where the code when executed by a processor causes the processor to implement a method as in any of aspects 1 to 12.

Aspect 16 is a method of wireless communication at a UE, comprising: receiving, from a base station, multiple zone IDs including a first zone ID and a corresponding set of ML model parameters, wherein each zone ID identifies a geographical zone and is associated with one or more ML model parameters; and applying a set of ML model parameters based on a location of the UE being within a corresponding zone ID for the set of ML model parameters.

In aspect 17, the method of aspect 16 further includes that each of the multiple zone IDs identifies a geographical zone by a latitude/longitude range.

In aspect 18, the method of aspect 16 or aspect 17 further includes that each of the multiple zone IDs comprises a sidelink zone ID.

In aspect 19, the method of any of aspects 16-18 further includes that the set of ML model parameters comprises a first set of ML model parameters based on a first location of the UE, the method further comprises: applying a second set of ML model parameters based on the UE moving to a second location within a second corresponding zone ID associated with the second set of ML model parameters.

In aspect 20, the method of any of aspects 16-19 further includes that the set of ML model parameters are dependent upon the geographical zone.

In aspect 21, the method of any of aspects 16-20 further includes that the set of ML model parameters are trained neural network parameters.

Aspect 22 is an apparatus for wireless communication including at least one processor coupled to a memory and configured to implement a method as in any of aspects 16 to 21.

Aspect 23 is an apparatus for wireless communication including means for implementing a method as in any of aspects 16 to 21.

Aspect 24 is a non-transitory computer-readable medium storing computer executable code, where the code when executed by a processor causes the processor to implement a method as in any of aspects 16 to 21.

Aspect 25 is a method of wireless communication at a UE, comprising: transmitting, to a base station, a set of ML model parameters; and transmitting, to the base station, position information for the UE associated with the set of ML model parameters.

In aspect 26, the method of aspect 25 further includes that the position information identifies a geographical zone based on a latitude/longitude range.

In aspect 27, the method of aspect 25 or aspect 26 further includes that the position information comprises a sidelink zone ID in which the UE is located.

Aspect 28 is an apparatus for wireless communication including at least one processor coupled to a memory and configured to implement a method as in any of aspects 25 to 27.

Aspect 29 is an apparatus for wireless communication including means for implementing a method as in any of aspects 25 to 27.

Aspect 30 is a non-transitory computer-readable medium storing computer executable code, where the code when executed by a processor causes the processor to implement a method as in any of aspects 25 to 26.

Aspect 31 is a method of wireless communication at a first UE, comprising: establishing a sidelink communication with a second UE; and transmitting, to the second UE, a set of one or more ML model parameters based on a location of the first UE, the one or more ML model parameters being associated with a geographic area including the location of the first UE.

In aspect 32, the method of aspect 31 further comprises: determining whether the second UE is located within one or more zone IDs associated with the geographic area; and determining whether the one or more ML model parameters apply to the second UE, wherein the first UE transmits the set of one or more ML model parameters to the second UE based on the second UE being located within the geographic area.

In aspect 33, the method of aspect 31 or aspect 32 further includes that each zone ID in the one or more zone IDs is a sidelink zone ID, and each sidelink zone ID identifies a geographical zone and is associated with one or more ML model parameters.

In aspect 34, the method of any of aspects 31-33 further includes that each sidelink ID is associated with the geographical zone by a latitude/longitude range.

In aspect 35, the method of any of aspects 31-34 further includes that the one or more ML model parameters are dependent upon the geographical area.

In aspect 36, the method of any of aspects 31-35 further includes that the one or more ML model parameters are trained neural network parameters.

Aspect 37 is an apparatus for wireless communication including at least one processor coupled to a memory and configured to implement a method as in any of aspects 31 to 36.

Aspect 38 is an apparatus for wireless communication including means for implementing a method as in any of aspects 31 to 36.

Aspect 39 is a non-transitory computer-readable medium storing computer executable code, where the code when executed by a processor causes the processor to implement a method as in any of aspects 31 to 36.

Aspect 40 is a method of wireless communication at a second UE, comprising: establishing a sidelink communication with a first UE; and receiving, from the first UE, one or more ML model parameters based on a subset of zone IDs identifying one or more geographical zones, the one or more ML model parameters being associated with the subset of zone IDs or the one or more geographical zones or both.

In aspect 41, the method of aspect 40 further includes that the second UE is associated with one or more zone IDs in the subset of zone IDs and the one or more ML model parameters apply to the second UE.

In aspect 42, the method of aspect 40 or aspect 41 further includes that each zone ID in the subset of zone IDs is a sidelink zone ID, and each sidelink zone ID identifies a geographical zone and is associated with one or more ML model parameters.

In aspect 43, the method of any of aspects 40-42 further includes that each sidelink ID is associated with a geographical zone by a latitude/longitude range.

In aspect 44, the method of any of aspects 40-43 further includes that the one or more ML model parameters are dependent upon the one or more geographical zones.

In aspect 45, the method of any of aspects 40-44 further includes that the one or more ML model parameters are trained neural network parameters.

Aspect 46 is an apparatus for wireless communication including at least one processor coupled to a memory and configured to implement a method as in any of aspects 40 to 45.

Aspect 47 is an apparatus for wireless communication including means for implementing a method as in any of aspects 40 to 45.

Aspect 48 is a non-transitory computer-readable medium storing computer executable code, where the code when executed by a processor causes the processor to implement a method as in any of aspects 40 to 45.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a base station, comprising:
   receiving, from a first user equipment (UE), an indication of a first zone identifier (ID) associated with sidelink communication and one or more machine learning (ML) model parameters based on the first zone ID that identifies a first geographical zone, the one or more ML model parameters being associated with the first zone ID, wherein the first zone ID is derived based on current location of the first UE with reference to coordinates (0, 0) of a World Geodetic System 84 (WGS84) model; and
   providing, from the base station, the one or more ML model parameters to a second UE based on the second UE being located in the first geographic zone indicated by the first zone ID associated with the sidelink communication.

2. The method of claim 1, further comprising:
   determining whether the one or more ML model parameters apply to one or more UEs in the first geographical zone, wherein the base station provides the one or more ML model parameters to the second UE based on a determination that the one or more ML parameters apply to a location of the second UE within the zone indicated by the zone ID.

3. The method of claim 1, further comprising:
   receiving a set of ML model parameters and position information from each of a plurality of UEs; and
   determining the set of ML model parameters associated with a geographic area based on the position information received from each of the plurality of UEs.

4. The method of claim 3, wherein the base station further determines the set of ML model parameters associated with the geographic area based on a correlation of the set of ML model parameters received from one or more UEs located within the geographic area.

5. The method of claim 1, wherein providing the one or more ML model parameters includes broadcasting the one or more ML model parameters with the indication of a corresponding zone ID.

6. The method of claim 1, further comprising:
   transmitting multiple zone IDs including the first zone ID and corresponding ML model parameters, wherein each zone ID identifies a geographical zone and is associated with the corresponding ML model parameters.

7. The method of claim 6, wherein each of the multiple zone IDs identifies the geographical zone by a latitude/longitude range.

8. The method of claim 6, wherein the multiple zone IDs each comprise a sidelink zone ID.

9. The method of claim 6, wherein the base station broadcasts a table with the multiple zone IDs and the corresponding ML model parameters.

10. The method of claim 9, further comprising:
    updating the table based on updated ML parameters received from one or more UEs for a corresponding zone ID.

11. The method of claim 1, wherein the first zone ID is derived based on:

$x_1 = \text{Floor}(x/L) \text{Mod } 64;$ $y_1 = \text{Floor}(y/L) \text{Mod } 64;$ the first zone ID = $y_1 * 64 + x_1$, L being a value of a sidelink zone length, x being a geodesic distance in longitude between the current location of the first UE and the coordinates (0, 0) of the WGS84 model, and y being the geodesic distance in latitude between the current location of the UE and the coordinates (0, 0) of the WGS84 model.

12. A method of wireless communication at a user equipment (UE), comprising:
    receiving, from a base station, multiple zone identifiers (IDs) including a first zone ID and a corresponding set of machine learning (ML) model parameters, wherein each zone ID identifies a geographical zone for sidelink communication and is associated with one or more ML model parameters, wherein the first zone ID is derived based on a location of at least one other UE with reference to coordinates (0, 0) of a World Geodetic System 84 (WGS84) model; and
    applying a set of ML model parameters based on the UE being located within a corresponding zone ID for the set of ML model parameters.

13. The method of claim 12, wherein each of the multiple zone IDs identifies the geographical zone by a latitude/longitude range.

14. The method of claim 12, wherein each of the multiple zone IDs comprises a sidelink zone ID.

15. The method of claim 12, wherein the set of ML model parameters comprises a first set of ML model parameters based on a first location of the UE, the method further comprising:
    applying a second set of ML model parameters based on the UE moving to a second location within a second corresponding zone ID associated with the second set of ML model parameters.

16. The method of claim 12, wherein the first zone ID is derived based on:

$x_1 = \text{Floor}(x/L) \text{Mod } 64;$ $y_1 = \text{Floor}(y/L) \text{Mod } 64;$ the first zone ID = $y_1 * 64 + x_1$, L being a value of a sidelink zone length, x being a geodesic distance in longitude between the location of the at least one other UE and the coordinates (0, 0) of the WGS84 model, and y being the geodesic distance in latitude between the at least one other UE and the coordinates (0, 0) of the WGS84 model.

17. A method of wireless communication at a first user equipment (UE), comprising:
    obtaining, at the first UE, a set of one or more machine learning (ML) parameters based on use of an ML model while the first UE is located within a zone ID;
    establishing, at the first UE, a sidelink communication with a second UE; and
    transmitting, from the first UE to the second UE based on the second UE being located within the zone ID, a sidelink transmission including the set of one or more ML model parameters that are associated with the zone ID of the first UE, wherein the zone ID is derived based on a current location of the first UE with reference to coordinates (0, 0) of a World Geodetic System 84 (WGS84) model.

18. The method of claim 17, further comprising:
determining that the second UE is located within one or more zone IDs associated with the zone ID; and
determining that the one or more ML model parameters apply to the second UE based on the second UE being located within the zone ID, wherein the first UE transmits the set of one or more ML model parameters to the second UE based on the second UE being located within the one or more zone IDs associated with the zone ID.

19. The method of claim 18, wherein each zone ID in the one or more zone IDs is a sidelink zone ID, and each sidelink zone ID identifies a geographical zone and is associated with one or more ML model parameters.

20. The method of claim 19, wherein each sidelink ID is associated with the geographical zone by a latitude/longitude range.

21. The method of claim 17, wherein the zone ID is derived based on:

$x_1 = \text{Floor}(x/L) \text{Mod } 64;$ $y_1 = \text{Floor}(y/L) \text{Mod } 64;$ the zone ID=$y_1*64+x_1$, L being a value of a sidelink zone length, x being a geodesic distance in longitude between the current location of the first UE and the coordinates (0, 0) of the WGS84 model, and y being the geodesic distance in latitude between the current location of the UE and the coordinates (0, 0) of the WGS84 model.

22. A method of wireless communication at a second user equipment (UE), comprising:
establishing a sidelink communication with a first UE; and
receiving, in a sidelink transmission from the first UE, one or more machine learning (ML) model parameters based on the second UE being located within zone ID in a subset of zone identifiers (IDs) identifying one or more geographical zones, the one or more ML model parameters being associated with the subset of zone IDs or the one or more geographical zones or both, wherein the subset of zone IDs is derived based on the location of the second UE with reference to coordinates (0, 0) of a World Geodetic System 84 (WGS84).

23. The method of claim 22, wherein the second UE is associated with one or more zone IDs in the subset of zone IDs and the one or more ML model parameters apply to the second UE.

24. The method of claim 22, wherein each zone ID in the subset of zone IDs is a sidelink zone ID, and each sidelink zone ID identifies a geographical zone and is associated with one or more ML model parameters.

25. The method of claim 24, wherein each sidelink ID is associated with the geographical zone by a latitude/longitude range.

26. The method of claim 22, the zone ID is derived based on:

$x_1 = \text{Floor}(x/L) \text{Mod } 64;$ $y_1 = \text{Floor}(y/L) \text{Mod } 64;$ the zone ID=$y_1*64+x_1$, L being a value of a sidelink zone length, x being a geodesic distance in longitude between a current location of the first UE and the coordinates (0, 0) of the WGS84 model, and y being the geodesic distance in latitude between the current location of the UE and the coordinates (0, 0) of the WGS84 model.

* * * * *